(12) United States Patent
Sekiguchi et al.

(10) Patent No.: US 9,329,769 B2
(45) Date of Patent: May 3, 2016

(54) DISPLAY/INPUT DEVICE AND IMAGE FORMING APPARATUS INCLUDING DISPLAY/INPUT DEVICE

(71) Applicant: KYOCERA DOCUMENT SOLUTIONS INC., Osaka (JP)

(72) Inventors: Yasuhiro Sekiguchi, Osaka (JP); Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 145 days.

(21) Appl. No.: 13/855,538

(22) Filed: Apr. 2, 2013

(65) Prior Publication Data

US 2013/0265252 A1    Oct. 10, 2013

(30) Foreign Application Priority Data

Apr. 9, 2012    (JP) .................................. 2012-088293

(51) Int. Cl.
*G06F 3/0488*    (2013.01)
*G03G 15/00*    (2006.01)
*H04N 1/00*    (2006.01)

(52) U.S. Cl.
CPC ............ *G06F 3/0488* (2013.01); *G03G 15/502* (2013.01); *G06F 3/04883* (2013.01); *H04N 1/00352* (2013.01); *H04N 1/00416* (2013.01); *G06F 2203/04808* (2013.01)

(58) Field of Classification Search
CPC ............. G03G 15/5016; G03G 15/502; G06F 2203/04808; G06F 3/0482; G06F 3/04883
USPC ...................................... 345/173–174; 399/81
See application file for complete search history.

(56) References Cited

U.S. PATENT DOCUMENTS

| | | | | |
|---|---|---|---|---|
| 7,158,123 B2* | 1/2007 | Myers et al. | ................... | 345/173 |
| 8,686,958 B2* | 4/2014 | Rutledge et al. | .............. | 345/173 |
| 2007/0220444 A1* | 9/2007 | Sunday | ................ | G06F 3/0488 715/788 |
| 2010/0073303 A1* | 3/2010 | Wu et al. | ........................ | 345/173 |
| 2012/0050192 A1* | 3/2012 | Kobayashi | .................... | 345/173 |
| 2012/0056837 A1* | 3/2012 | Park et al. | ..................... | 345/173 |
| 2012/0210275 A1* | 8/2012 | Park et al. | ..................... | 715/810 |
| 2012/0250060 A1* | 10/2012 | Shigenobu | ......... | H04N 1/00387 358/1.13 |

FOREIGN PATENT DOCUMENTS

JP     2007-241410 A    9/2007

* cited by examiner

*Primary Examiner* — Quan-Zhen Wang
*Assistant Examiner* — Xuemei Zheng
(74) *Attorney, Agent, or Firm* — Studebaker & Brackett PC

(57) ABSTRACT

A display/input device includes a display section, a touch panel, and a control section. The display section displays an image. The touch panel detects touch with a display surface of the display section. When the touch panel detects touch of two points of which a positional relationship indicates a first direction, the control section allows the display section to display a plurality of images in a second direction different from the first direction. The control section changes a selected state of an image of the plurality of images according to move of one of the two points.

20 Claims, 11 Drawing Sheets

FIG. 6

Box Screen

| Number | Box name | User | Used amount |
|--------|----------|------|-------------|
| 001 | Kaihatu | aaaa | ---- |
| 002 | Eigyou | bbbb | ---- |
| 003 | Gijyutu | cccc | ---- |

Box Registration/Edition

Document save — Detail — Open

Job box / User box

FIG. 7

Address Book

| No. | Name | Detail |
|-----|------|--------|
| 9995 | Technology department | 06-6764-6666 |
| 9996 | Kyocera Mita | 06-6764-7777 |
| 9997 | Kyocera Mita 2 | aaaa@kyocera |
| 9998 | Kyocera Mita 3 | 06-6764-5555 |

Detail 1 2 3 4 5 6 7 8 9 0
A-C D-F G-I J-L M-O P-S T-V W-Z

E-mail  Folder  FAX  i-FAX   Cancel  OK

DISPLAY/INPUT DEVICE AND IMAGE FORMING APPARATUS INCLUDING DISPLAY/INPUT DEVICE

INCORPORATION BY REFERENCE

The present application claims priority under 35 U.S.C. §119 to Japanese Patent Application No. 2012-088293, filed Apr. 9, 2012. The contents of this application are incorporated herein by reference in their entirety.

BACKGROUND

The present disclosure relates to a display/input device including a display section and a touch panel and an image forming apparatus including such a display/input device.

Image forming devices, such as copiers, multifunction peripherals, printer, facsimile machines, etc. are provided with a display/input device (e.g., an operation panel). For example, a user operates keys and the like displayed in the display/input device for input of various settings to obtain a desired result. Conventionally, operation of two-point touch with the touch panel is rejected. While nowadays, there are some devices which receive two-point touch as one scheme of input.

For example, some display device (a navigation device) includes a display device, a touch panel, a segment calculation means, and a display changing means. The display device displays a plurality of videos. The touch panel, which is provided in front of the display device, outputs information indicating the state of the two-point touch performed in a predetermined period. The segment calculation means calculates the positional coordinates of the two points by the touch on the basis of the information output from the touch panel. Then, the segment calculation means calculates the direction and the length of the segment defined by the position coordinates of the two points. The display changing means changes the video display state of the videos on the display device on the basis of the calculation result by the segment calculation means. Further, when the direction of the segment calculated by the segment calculation means is vertical or transverse, and the display device does not display an on-screen menu (soft keys), the display changing means allows the display device to display the on-screen menu. With this configuration, the two-point touch is utilized in the video display state.

Further, for example, another display device switches, upon receipt of two-point touch, the display direction to the transverse direction when the on-screen menu (soft keys) at that time is displayed vertically, or to the vertical direction when the on-screen menu at that time is displayed transversely. In this way, the display device switches the display direction of the on-screen menu displayed at that time to a different display direction without exception upon receipt of the two-point touch.

SUMMARY

A display/input device according to a first aspect of the present disclosure includes a display section, a touch panel, and a control section. The display section displays an image. The touch panel detects touch with a display surface of the display section. When the touch panel detects touch of two points of which a positional relationship indicates a first direction, the control section allows the display section to display a plurality of images in a second direction different from the first direction. The control section changes a selected state of an image of the plurality of images according to move of one of the two points.

A display/input device according to a second aspect of the present disclosure includes a display section, a touch panel, a determination section, and a control section. The display section displays an image. The touch panel detects touch with a display surface of the display section. The determination section determines, when the touch panel detects two points, a positional relationship between the two points. The control section allows, when it is determined that the positional relationship between the two points indicates a first direction, the display section to display a plurality of images along a second direction different from the first direction and allows, when it is determined that the positional relationship between the two point indicates the second direction, the display section to display the plurality of images along the first direction. The plurality of images displayed in the first direction include all or some of the plurality of images displayed in the second direction, or are different from the plurality of images displayed in the second direction.

An image forming apparatus according to a third aspect of the present disclosure includes the display/input device according to the first aspect and an image forming section. The image forming section forms an image on a recording medium according to a set content input through the display/input device.

BRIEF DESCRIPTION OF THE DRAWINGS

FIG. 6 is an explanatory drawing showing one example of an initial setting screen for a box function according to one embodiment of the present disclosure.

FIG. 7 is an explanatory drawing showing one example of an initial setting screen for a scan/transmission function according to one embodiment of the present disclosure.

DETAILED DESCRIPTION

Figure 1:
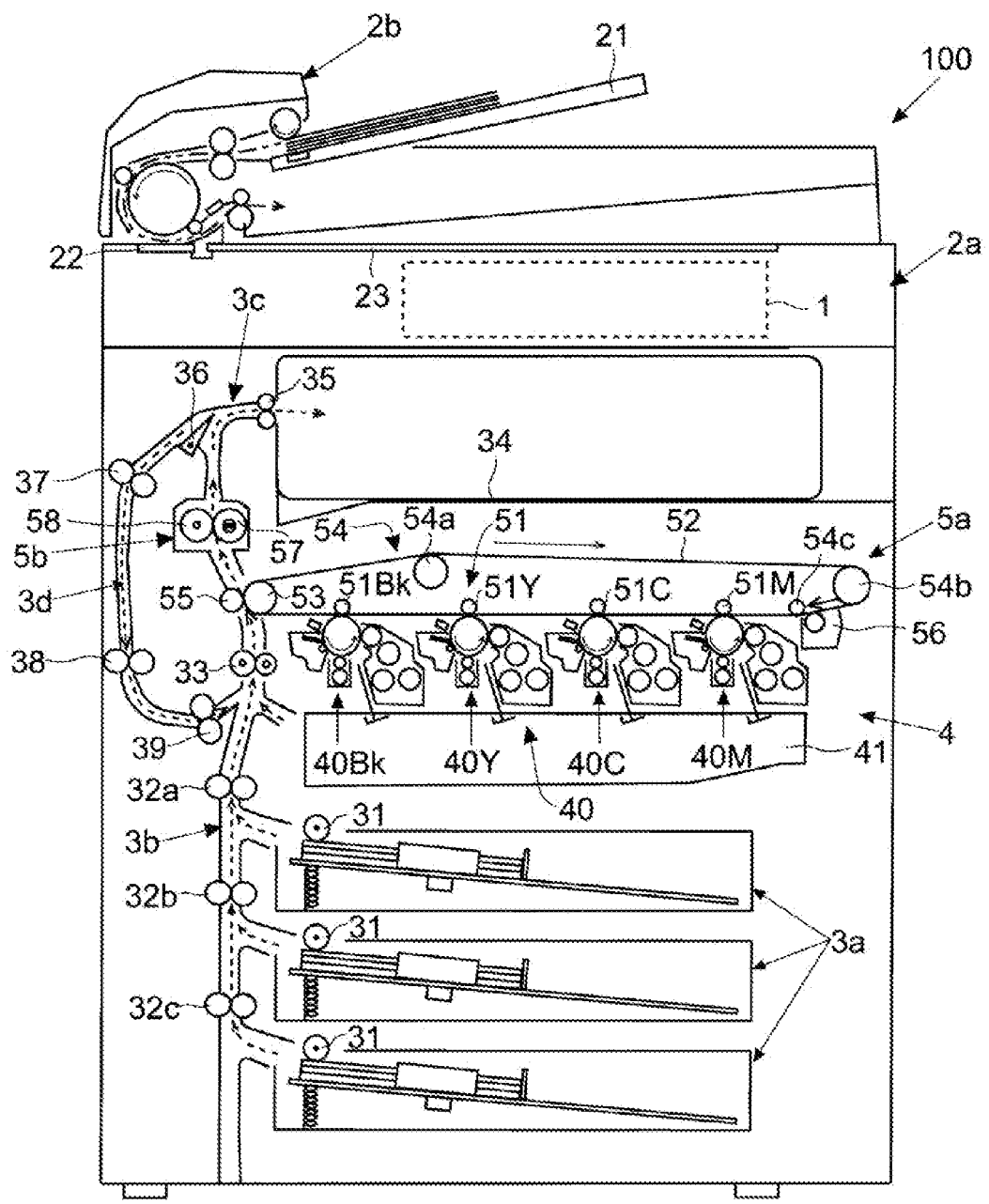
FIG. 1 is a schematic front cross sectional view showing one example of a multifunction peripheral according to one embodiment of the present disclosure.

Embodiments will be described below with reference to FIGS. 1-17. In the drawings, like numerals denote like or corresponding elements to omit description thereof. Description will be made below about a multifunction peripheral 100 (corresponding to an image forming apparatus) including an operation panel 1 (corresponding to a display/input device) as one example. It should be noted that the configuration, arrangement, etc. of each element are only examples and not intended to limit the scope of the disclosure.
(Outline of Image Forming Apparatus)

First, the multifunction peripheral 100 according to one embodiment will be schematically described with reference to FIG. 1. FIG. 1 is a schematic front cross sectional view showing one example of the multifunction peripheral 100.

As shown in FIG. 1, an operation panel 1, which will be described later, for various settings of the multifunction peripheral 100 is provided in the front of the multifunction peripheral 100. Further, as shown in FIG. 1, the multifunction peripheral 100 in the present embodiment includes on the top thereof an image reading section 2a and an original document feeder 2b. The multifunction peripheral 100 includes thereinside a plurality of paper feeders 3a, a conveyance section 3b, an image forming section 4, an intermediate transfer section 5a, a fusing section 5b, an ejection/conveyance section 3c, and a duplex/conveyance section 3d, etc.

The original document feeder 2b includes a document feed tray 21. Original documents to be subjected to copying or scanning are placed on the document feed tray 21. Then, the original document feeder 2b conveys the original documents from the document feed tray 21 sheet by sheet automatically in a consecutive manner to a reading station (a contact glass 22 for forwarding/reading). Further, the original document feeder 2b is mounted on the image reading section 2a. The original document feeder 2b is openable/closable in the vertical direction about the rear edge of the original document feeder 2b as an axis. The original document feeder 2b functions as a cover that presses contact glasses of the image reading section 2a (the contact glass 22 for forwarding/reading and a contact glass 23 for placing/reading) from above.

As shown in FIG. 1, the contact glass 22 for forwarding/reading and the contact glass 23 for placing/reading are disposed on the top of the image reading section 2a. The contact glass 23 for placing/reading is a glass on which an original document is to be placed when original documents, such as a book, is to be read page by page. Further, a lamp, a mirror, a lens, an image sensor, etc. are provided inside the image reading section 2a. The image sensor reads an original document according to light reflected by the original document, which the original document feeder 2b allows to pass on the contact glass 22 for forwarding/reading or which is placed on the contact glass 23 for placing/reading. Then, the image sensor converts the reflected light to an analog electrical signal according to an image density for quantization of the electrical signal. Thus, image data of the original document is obtained. It is noted that the image reading section 2a of the present embodiment is readable both in color and monochrome.

The respective paper feeders 3a in the multifunction peripheral 100 accommodate various types of plural pieces of paper (e.g., copier paper, recycled paper, cardboard, viewgraphs, etc.) in various sizes (e.g., standard-size paper in A size, such as A4, B size, such as B4, letter size paper, etc.). Each paper feeder 3a includes a paper feed roller 31 that is driven and rotated to forward paper sheet by sheet to the conveyance section 3b in printing. It is noted that the paper and the sheet are examples of a recording medium.

The conveyance section 3b forms a path through which the paper is conveyed from the paper feeders 3a to the image forming section 4. There are provided in the conveyance section 3b a guide plate, conveyance roller pairs 32 (three in total of a conveyance roller pair 32a, a conveyance roller pair 32b, and a conveyance roller pair 32c from above in FIG. 1), a registration roller pair 33, etc. The guide plate is a plate to guide the paper. The conveyance roller pairs 32 are driven and rotated in paper conveyance. The registration roller pair 33 stops the conveyed paper before the image forming section 4 and feeds it at transfer timing of a formed toner image. The image forming section 4 includes a plurality of image forming units 40 (a black image forming unit 40Bk, a yellow image forming unit 40Y, a cyan image forming unit 40C, and a magenta image forming unit 40M) and an exposure device 41. Each of the image forming units 40 includes a photosensitive drum, an electrostatic charger, a developing unit, cleaner, etc. The photosensitive drum is supported in a manner that can be driven and rotated. The electrostatic charger, the developing unit, and the cleaner are provided around the photosensitive drum. The exposure device 41 scans and exposes each photosensitive drum on the basis of image data read in the image reading section 2a, image data stored in a storage device 62, which will be described later, or the like, while outputting so as to blink laser light. Thus, toner images are formed on the peripheral surfaces of the photosensitive drums by the image forming units 40 and the exposure device 41.

The intermediate transfer section 5a receives the toner images from the respective image forming units 40 as primary transfer and performs secondary transfer on the paper. The intermediate transfer section 5a includes a plurality of primary transfer rollers 51 (a primary transfer rollers 51Bk to a primary transfer roller 51M), an intermediate transfer belt 52, a drive roller 53, a plurality of driven rollers 54 (a driven roller 54a to a driven roller 54c), a secondary transfer roller 55, a belt cleaner 56, etc. The intermediate transfer belt 52 is wound to the drive roller 53 and the like with tension applied. This allows the intermediate transfer belt 52 to be rotated through the drive and rotation of the drive roller 53 connected to a drive mechanism, such as a motor (not shown). Subsequently, voltage for transfer is applied to each primary transfer roller 51Bk to 51M, thereby transferring the toner images on the respective photosensitive drums to the intermediate transfer belt 52. After the toner images are primarily transferred to the intermediate transfer belt 52 in a manner that they are overlaid with each other without displacement, the secondary transfer roller 55, to which predetermined voltage is applied, transfers the overlaid toner images to the paper.

The fusing section 5*b* fuses the toner images transferred to the paper. The fusing section 5*b* includes a heating roller 57, in which a heating element is built, and a pressure roller 58. The pressure roller 58 is in contact with and pressed by the heating roller 57. Next, when the paper passes through a nip formed between the heating roller 57 and the pressure roller 58, the toner is heated and melts, thereby fusing the toner images to the paper. The paper ejected from the fusing section 5*b* is sent toward the exit tray 34.

The ejection/conveyance section 3*c* turns the printed paper toward either the exit tray 34 or the duplex/conveyance section 3*d*. The ejection/conveyance section 3*c* includes an ejection roller pair 35. The ejection roller pair 35 is driven and rotated in the forward rotation direction to send out the paper toward the exit tray 34. Alternatively, the ejection roller pair 35 is rotated in the backward rotation direction for switch back in duplex printing. Further, the ejection/conveyance section 3*c* includes a changeover valve 36 for switch over of the paper conveyance direction. The changeover valve 36 rotates. The changeover valve 36 is located at an original position where the path to the duplex/conveyance section 3*d* is closed to guide the paper toward the exit tray 34. By contrast, in duplex printing, the changeover valve 36 is rotated to guide the paper, which has been subjected to simplex copying and switch back, toward the duplex/conveyance section 3*d*. The duplex/conveyance section 3*d* connects the downstream side of the fusing section 5*b* to the upstream side of the registration roller pair 33. The duplex/conveyance section 3*d* includes a plurality duplex/conveyance roller pairs 37-39 that are driven and rotated for duplex printing. Thus, the paper subjected to simplex printing is conveyed to the duplex/conveyance section 3*d*.

(Operation Panel 1)

Figure 2:
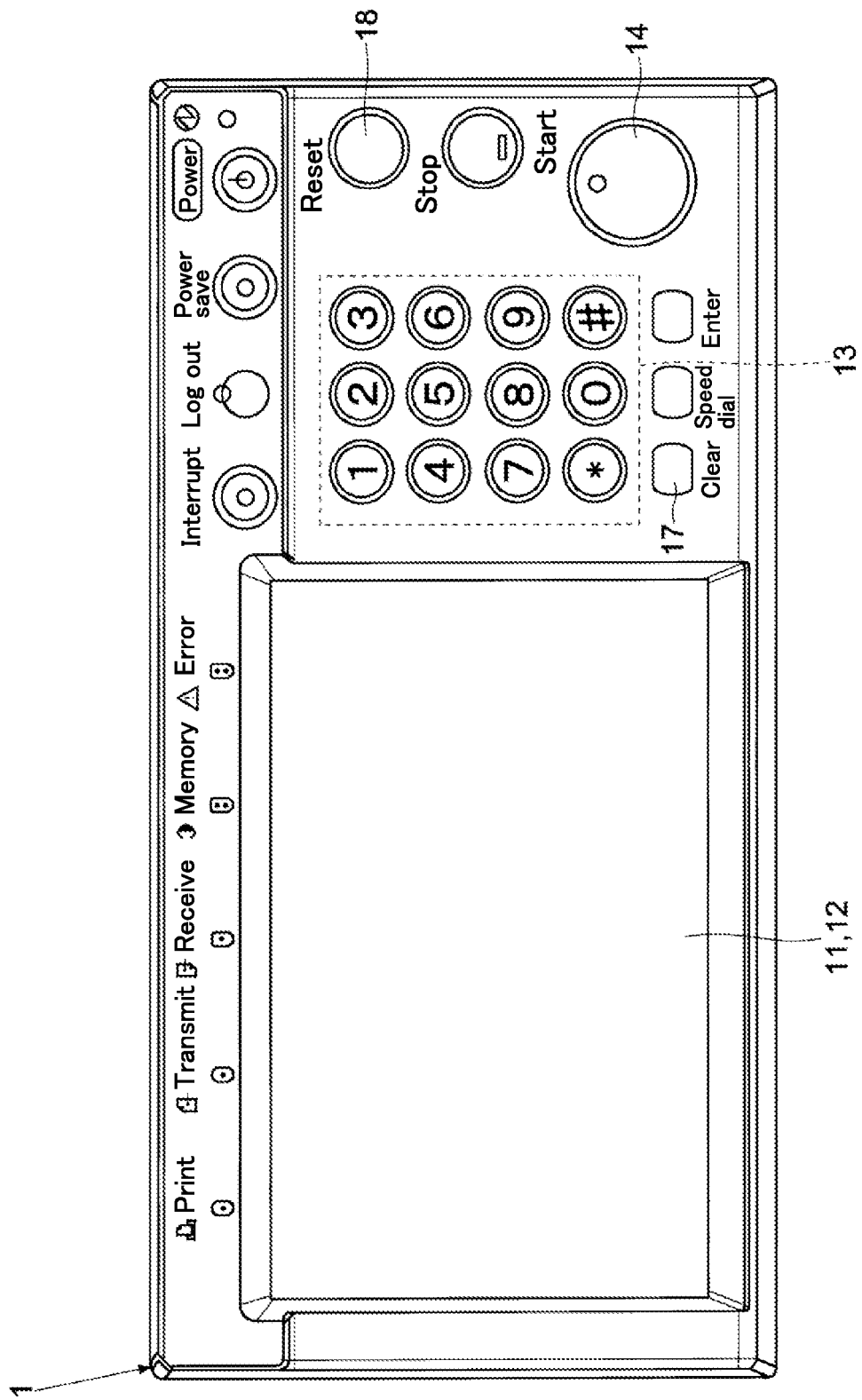
FIG. 2 is a plan view showing one example of an operation panel according to one embodiment of the present disclosure.

With reference to FIG. 2, one example of the operation panel 1 according to the present embodiment will be described next. FIG. 2 is a plan view showing one example of the operation panel 1. It is noted that the image forming section 4 forms an image on a recording medium in accordance with a set content input through the operation panel 1.

As shown in FIG. 1, the operation panel 1 is provided at the upper part of the front surface of the multifunction peripheral 100. The operation panel 1 includes a display section 11, a touch panel 12, and hard keys (e.g., a numeric keypad 13 for numerical input, a start key 14 for copying start or another processing start, etc.).

For example, the display section 11 is a liquid crystal display panel. The display section 11 may be a display panel of any type, such as an organic EL panel. The display section 11 displays menus and keys for setting of the multifunction peripheral 100. The user can specify a key displayed on the display section 11 to input various settings of the multifunction peripheral 100. Further, the display section 11 displays various types of images or screens for state massages and the like of the multifunction peripheral 100.

Furthermore, a touch panel 12 is provided on the top of the display section 11. The touch panel 12 detects the position or coordinates where the user touches. Comparison of the position where the key is displayed with the position of the touched point results in specification of the key that the user specifies, thereby receiving the user's input.

The touch panel 12 can recognize positions of a plurality of points that are simultaneously touched. In view of this, a projected capacitive touch panel may be employed as the touch panel 12, for example. It is noted that the touch panel 12 is required only to recognize positions of a plurality of points that are simultaneously touched and is not necessarily limited to the touch panel of capacitive type.

It is noted that the multifunction peripheral 100 of the present embodiment can serve a plurality of functions, such as a copying function, a scan/transmission function, a box function, etc. Conventional operation panels are provided with hard keys for function selection (e.g., a copy key, a transmission key, a box key, etc.). By contrast, in the present embodiment, the user can select any function to be used by simple operation through the operation panel 1. Accordingly, no hard keys for function selection are provided (need not be provided) in the operation panel 1 of the present embodiment.

(Hardware Configuration of Multifunction Peripheral 100 and Operation Panel 1)

Figure 3:
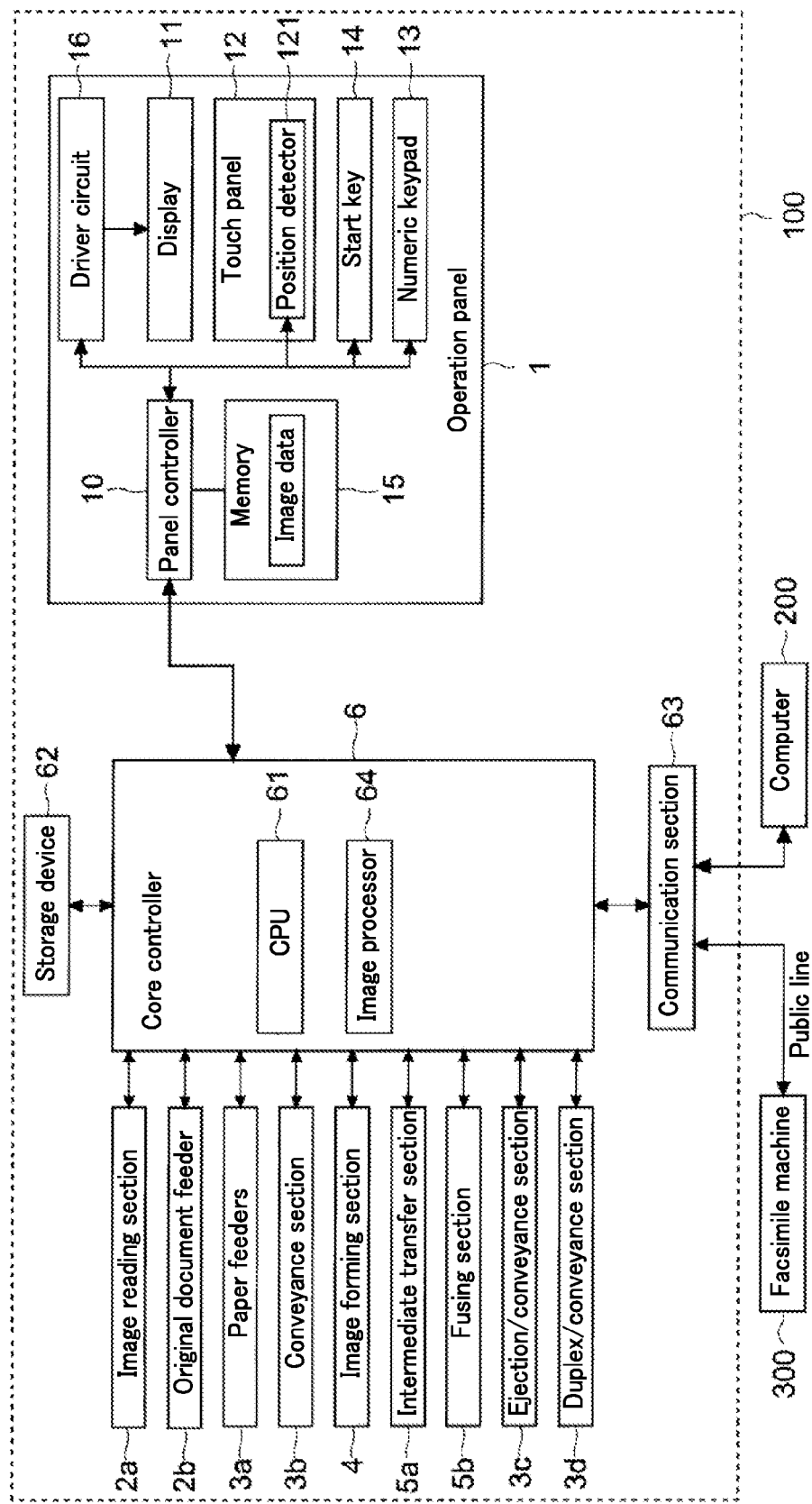
FIG. 3 is a block diagram showing one example of hardware configurations of the multifunction peripheral and the operation panel according to one embodiment of the present disclosure.

With reference to FIG. 3, one example of hardware configurations of the multifunction peripheral 100 and the operation panel 1 according to the present embodiment will be described next. FIG. 3 is a block diagram showing one example of hardware configurations of the multifunction peripheral 100 and the operation panel 1.

A core controller 6 is provided in the multifunction peripheral 100. For example, the core controller 6 is connected to the operation panel 1, the original document feeder 2*b*, the image reading section 2*a*, the paper feeders 3*a*, the conveyance section 3*b*, the image forming section 4, the fusing section 5*b*, the ejection/conveyance section 3*c*, etc. and controls them.

For example, the core controller 6 includes elements for control, such as a central processing unit (CPU) 61, etc. The CPU 61 performs arithmetic operation and the like on the basis of control programs, which are stored and loaded in a storage device 62, to control the respective parts of the multifunction peripheral 100. It is noted that the core controller 6 may be divided into plural parts for the respective sections, such as a main control section, an engine controller, etc. The main control section performs entire control and image processing. The engine controller performs ON/OFF control of motors, etc. to rotate various rotary members, image formation, and the like, thereby controlling printing. The present specification describes the core controller 6 in which the main control section and the engine controller are combined together.

The storage device 62 is connected to the core controller 6. The storage device 62 is a combination of a nonvolatile device and a volatile device, such as a ROM, a RAM, a HDD, etc. The storage device 62 can store various types of data, such as a control programs, control data, setting data, image data, etc. for the multifunction peripheral 100

The core controller 6 is connected also to an interface section (hereinafter referred to as a communication section 63), which includes various types of connectors and/or sockets, a facsimile modem, etc. The communication section 63 is connected via a network and/or a public line or the like to a plurality of external computers 200 (e.g., a personal computer and a server) and other facsimile machines 300 (only one is shown for each of them in FIG. 3 for the sake of convenience). For example, the core controller 6 can allow the storage device 62 to store image data obtained in the image reading section 2*a* (box function) and can transmit the image data obtained in the image reading section 2*a* to an external computer 200 or another facsimile machine 300 (scan function and fax function). Further, the core controller 6 can also perform printing, faxing, etc. on the basis of the image data, which is transmitted from an external computer 200 or another facsimile machine 300 and input to the multifunction peripheral 100 (printing function and fax function).

Further, for example, the core controller 6 includes an image processor 64. The image processor 64 processes image data obtained by reading an original document in the image reading section 2a or image data input to the multifunction peripheral 100 through the communication section 63. The image data processed by the image processor 64 is transmitted to, for example, the exposure device 41 for scan and exposure of the photosensitive drums, or is stored in the storage device 62.

Further, the core controller 6 recognizes input to the operation panel 1 to control the multifunction peripheral 100 so that a job, such as copying, scanning, or the like is performed in accordance with the user's setting. The operation panel 1 in the present embodiment includes a panel controller 10 (corresponding to a control section and a determination section), the display section 11, the touch panel 12, the hard keys (e.g., the numeric keypad 13 and the start key 14), a memory 15, a driver circuit 16, etc. The panel controller 10 is composed of a CPU, an integrated circuit (IC), etc. The panel controller 10 controls display of the display section 11, receives output from the touch panel 12, and specifies the position (coordinates) of a touched point. The memory 15 stores data of a table or the like that indicates the relationship between the output from the touch panel 12 and the position (coordinates). The panel controller 10 compares the position of the touched point with a position of the image in a screen that the display section 11 displays in touching to recognize a key displayed at the touched point. Thus, the panel controller 10 recognizes the key that the user specifies.

The user selects a function from the various functions of the multifunction peripheral 100 in normal operation. Then, the user selects a parameter, which is settable in the selected function (e.g., scaling, density, N-in-1, duplex, etc. when the copying function is selected). Subsequently, the user sets a parameter value of the selected parameter. In such function selection and setting, the user repeats specification (selection) of keys displayed on the display section 11, starting from a display screen (a home screen 7 in FIG. 4) at the top of a hierarchy of the display section 11. The display screen of the display section 11 is accordingly switched by each key specification (selection). Finally, the parameter value of the target function to be set is set. The panel controller 10 recognizes function selection and setting and transmits the set content to the core controller 6. The core controller 6 accordingly allows each part of the image forming section 4, etc. to perform the operation corresponding to the function selected and set through the operation panel 1 so that the user's intention is reflected to the job, such as printing.

Image data of screens and images to be displayed on the display section 11 is stored in, for example, the memory 15 in the operation panel 1. The panel controller 10 reads out image data of a screen or an image to be displayed next from the memory 15 in accordance with a key displayed at the position of the touched point. It is noted that the storage device 62 may store the image data of the screens and images that the display section 11 displays. In this case, the operation panel 1 receives the image data for display on the display section 11 from the storage device 62 via the core controller 6. In both cases, the panel controller 10 provides an instruction to the driver circuit 16 (e.g., a liquid crystal driver IC where the display section 11 is a liquid crystal display panel) to allow the display section 11 to perform display on the basis of the image data. The driver circuit 16 actually controls display of the display section 11. It is noted that the operation panel 1 may not include the panel controller 10 and the memory 15, while the core controller 6 (CPU 61 and the storage device 62) functions as the panel controller 10 and the memory 15.

Further, the touch panel 12 includes a position detector configured to detect the position of a touched point. For example, the position detector 121 may be an IC to detect a touched point. Where the touch panel 12 is a projected capacitive touch panel, for example, the position detector 121 detects variation in capacitance in the touch panel 12 and outputs a signal indicative of position(s) of one point or a plurality of simultaneously touched points. The panel controller 10 recognizes the position of the touched point on the basis of the output from the position detector 121.

(Home Screen 7 and Function Selection)

Figure 4:
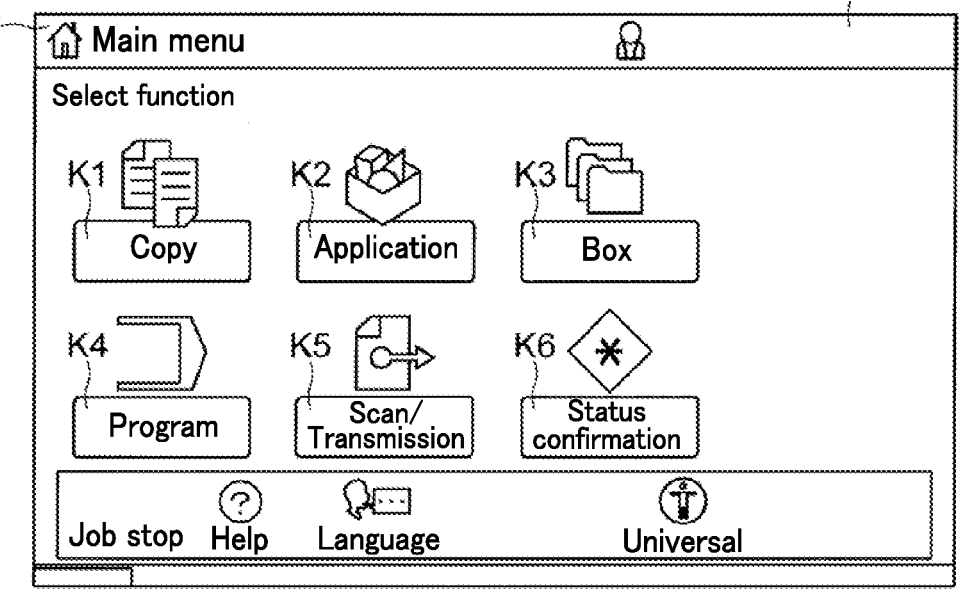
FIG. 4 is an explanatory drawing showing one example of a home screen displayed on the operation panel according to one embodiment of the present disclosure.
Figure 5:
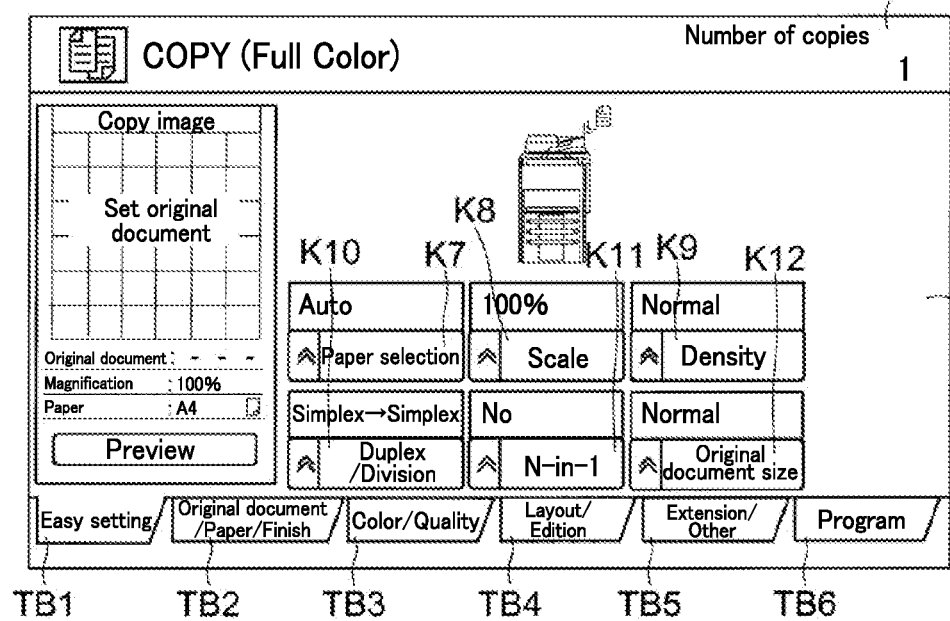
FIG. 5 is an explanatory drawing showing one example of an initial setting screen for a copying function according to one embodiment of the present disclosure.

Next, the home screen 7 displayed on the operation panel 1 according to the present embodiment will be described with reference to FIGS. 4-7. FIG. 4 is an explanatory drawing showing one example of the home screen 7 displayed on the operation panel 1. FIG. 5 is an explanatory drawing showing one example of an initial setting screen 71 for the copying function. FIG. 6 is an explanatory drawing showing one example of an initial setting screen 72 for the box function. FIG. 7 is an explanatory drawing showing one example of an initial setting screen 73 for the scanning/transmitting function.

The operation panel 1 of the present embodiment displays the home screen 7 for selection of a function that that the user desires to use. For example, when a clear key 17 or a reset key 18 provided in the operation panel 1 is pushed (see FIG. 2), the panel controller 10 allows the display section 11 to display the home screen 7. Further, for example, when a predetermine time period elapses after the last input to the operation panel 1 (touch to the touch panel 12 or pushing a hard key), the panel controller 10 may allow the display section 11 to display the home screen 7 while clearing a currently set content (auto-clear function).

The home screen 7 is located at the top of the hierarchy. For example, the home screen 7 includes, as function selection keys, a copy key K1, an application key K2, a box key K3, a program key K4, a scan/transmission key K5, and a status confirmation key K6. The touch panel 12 outputs data (signal) indicating the position of the touched point to the panel controller 10. On the basis of the output from the touch panel 12, the panel controller 10 recognizes that the function corresponding to the function selection key displayed at the position of the touched point is specified. Then, the panel controller 10 allows the display section 11 to display an initial setting screen of the specified function. For example, when the panel controller 10 recognizes specification of the copying function, it allows the display section 11 to display the initial setting screen 71 for the copying function. In this way, the user can select a desired function through the home screen 7.

Now, one example of the initial setting screen for each function will be described with reference to FIGS. 5-7. The initial setting screen 71 for the copying function will be described first with reference to FIG. 5.

Upon specification of the copying function, the panel controller 10 allows the display section 11 to display the initial setting screen 71 for the copying function as the first setting screen. As shown in FIG. 5, the initial setting screen 71 for the copying function includes a plurality of easy setting keys K7-K12 for setting of frequently used parameters, for example. FIG. 5 shows an example in which the easy setting key K7 for parameter selection, "paper selection", the easy setting key K8 for parameter selection, "scaling", etc. are displayed Further, in order for the user to set a parameter that is not displayed on the initial setting screen 71 (e.g., a parameter for frame deletion setting, a parameter for margin setting, a parameter for reading resolution setting, a parameter for original document type setting, etc.), the user touches an area that displays any of an original document/paper/finish tub TB2, color/quality tub TB3, a layout/edition tub TB4, an extension/other tub TB5, and a program tub TB6, which are displayed in alignment with the easy setting tub TB1. Each of the parameters is associated with a corresponding tub in advance. When an area where any tub is displayed is touched, the panel controller 10 allows the display section 11 to display a setting screen that includes in a list manner the setting keys of the parameter associated with the tub specified by the touch.

For example, when the area where the original document/paper/finishing tub TB2 is displayed is touched, the panel controller 10 allows the display section 11 to display a setting screen including a plurality of keys indicating parameters relating to original documents and paper. The parameters relating to the original documents and paper may be, for example, "original document size", "paper size", "original document direction", "paper direction", "paper feeder", etc. When the area where the color/quality tub TB3 is displayed is touched, the panel controller 10 allows the display section 11 to display a setting screen including a plurality of keys indicating parameters relating to color and quality. The parameters relating to color and quality may be, for example, "print color (color, monochrome, etc.)", "resolution", "shading adjustment of each color (black, cyan, magenta, and yellow)", etc. Further, when the area where the layout editing tub TB4 is displayed is touched, the panel controller 10 allows the display section 11 to display a setting screen including a plurality of keys indicating parameters relating to image layout and image data edition. The parameters relating to image layout and image data edition may be, for example, "N-in-1 print", "duplex", etc. Furthermore, when the area where the extension/other tub TB5 is displayed is touched, the panel controller 10 allows the display section 11 to display a setting screen including a plurality of keys indicating parameters relating to contents of extendable items. The parameters relating to the contents of the extendable items may be, for example, "margin size", "frame deletion", etc.

The user touches any area where a desired tub is displayed and then touches an area where any setting key of the displayed setting keys is displayed, thereby specifying a parameter. According to the specification, the panel controller 10 allows the display section 11 to display a setting screen for the specified parameter. For example, where the parameter of N-in-1 print is specified, the user can set a desired parameter value, such as 2-in-1, 4-in-1, etc. through the setting screen of the N-in-1 print. Thus, the user can switch the setting screen and set a parameter value of a desired parameter.

The initial setting screen 72 for the box function will be described next with reference to FIG. 6.

When the box function is specified, the panel controller 10 allows the display section 11 to display the initial setting screen 72 for the box function as a first setting screen. Part of a storage region of the storage device 62 (HDD) is assigned for the box function. The assigned storage region is virtually divided by a box unit. For example, the user can make image data store into a box and reuse (for printing, transmission, etc.) the image data stored in the box.

The initial setting screen 72 includes a box name list display region R1. The user can specify a desired box by touching an area in the box name list display region R1. Then, when the user touches an area where a document save key K13 is displayed after specification of the box, the image data obtained by reading the original document by the image reading section 2a can be stored into the specified box (HDD of the storage device 62). It is noted that when the document save key K13 is specified, the panel controller 10 allows the display section 11 to display the setting screen for scan parameters (e.g., a screen for setting of resolution, size of the original document, and size of the image data obtained by reading), thereby allowing the user to carry out setting relating to original document reading and setting relating to image data storage to the box. Further, when the user touches an area where an open key K14 is displayed after specification of the box, the image data or the like stored in the box can be printed and transmitted. It is noted that when the open key K14 is specified, the panel controller 10 allows the display section 11 to display a setting screen (e.g., a screen for setting of duplex, N-in-one, and transmission destination) relating to utilization (printing and transmission) in the box, thereby allowing the user to carry out setting relating to reuse of the data in the box.

The initial setting screen 73 for the scan/transmission function will be described next with reference to FIG. 7.

Upon specification of the scan/transmission function, the panel controller 10 allows the display section 11 to display the initial setting screen 73 for the scan/transmission function shown in FIG. 7 as a first setting screen. The scan/transmission function is a function of reading an original document, transmitting by an email the image data of the original document obtained by reading, transmitting the image data to a desired computer 200, or transmitting the image data to a desired facsimile machine 300.

The panel controller 10 allows the display section 11 to display, for example, an address list as the initial setting screen 73. The initial setting screen 73 includes an address list display region R2 for display of address names and address information in a list manner. The user touches an area in the address list display region R2 to specify an address to which data is desired to be transmitted. After the specification of the address, the user touches an area where a desired transmission method key is displayed in a transmission specification method key group KG1, thereby specifying the transmission method. Upon specification of the transmission method, the panel controller 10 allows the display section 11 to display, according to the specified transmission method, a setting screen for detailed setting for the transmission (e.g., a screen for setting of the size of an image or data to be transmitted, etc.), thereby allowing the user to carry out setting relating to the transmission.

It is noted that, though not shown, when the application function is specified, the panel controller 10 calls up an application installed in the storage device 62 and allows the display section 11 to display an initial setting screen for setting. For example, the application may be a program or data to enhance convenience of the multifunction peripheral 100. Examples of the application include various applications for target purposes, such as an application for text data origination or database compilation of image data obtained by scanning an original document, such as a name card, an application for electronic documentation of data obtained by scanning an original document.

When the program function is specified, the panel controller 10 calls up (activates) a predetermined program and allows the display section 11 to display an initial setting screen for program creation. Parameter values of one or more parameters are defined in advance in the program. For example, the most frequently combined parameter values of the respective parameters are defined in advance in the program (registered in advance). When the program is called up, the panel controller 10 recognizes that the setting is performed with parameter value of each specified parameter defined in the called-up program. In this way, the user's one touch can results in setting of a plurality of parameter values of the parameters.

Further, when the status confirmation key K6 is specified, the panel controller 10 allows the display section 11 to display a status display screen that displays the status of the multifunction peripheral 100. For example, the panel controller 10 allows the display section 11 to display, in the status display screen, the content of a job that is being performed, such as printing, original document reading, etc. Further, the panel controller 10 may allow the display section 11 to display the accumulated number of printing, the amount of paper remaining in each paper feeder 3a, etc. in the status display screen. The panel controller 10 may allow the display section 11 to display the status relating to devices and parts of the multifunction peripheral 100, such as the used amount and the remaining capacity of the storage device 62, etc.

(Determination of positional relationship between touched two points)

Figure 8:
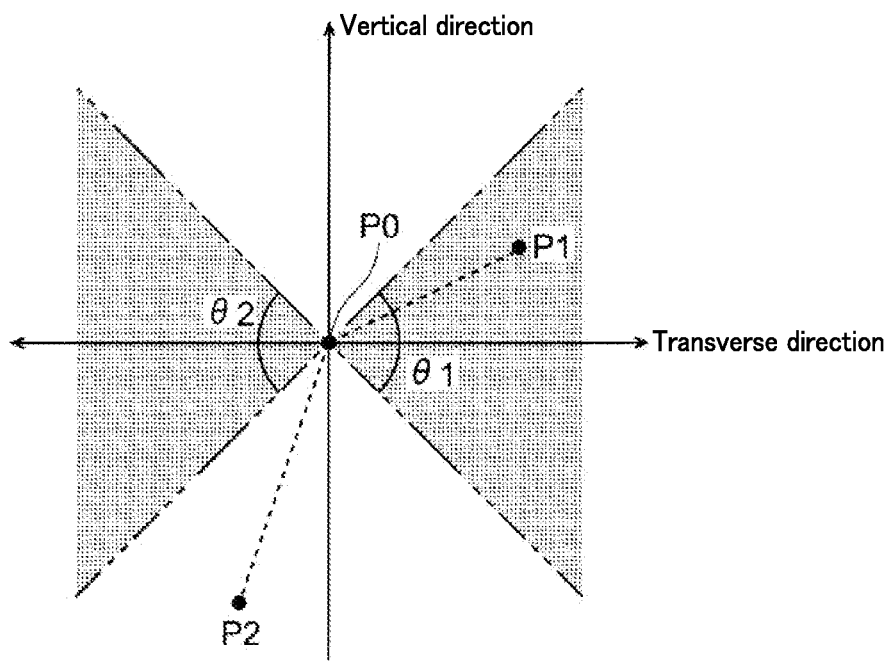
FIG. 8 is an explanatory drawing showing one example of a determination method as to whether the positional relationship between touched two points indicates either the vertical direction or the transverse direction based on an angle defined by the touched two points according to one embodiment of the present disclosure.
Figure 9:
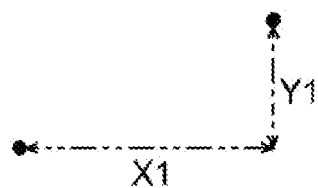
FIG. 9 is an explanatory drawing showing one example of a determination method as to whether the positional relationship between touched two points indicates either the vertical direction or the transverse direction based on distances defined by touched two points according to one embodiment of the present disclosure.

A method for determining the positional relationship between touched two points will be described next with reference to FIGS. 8 and 9. FIG. 8 is an explanatory drawing showing one example of a method for determining whether the positional relationship between touched two points indicates either a vertical direction or a transverse direction on the basis of an angle defined by the two points. FIG. 9 is an explanatory drawing showing one example of a method for determining whether the positional relationship between touched two points indicates either a vertical direction or a transverse direction on the basis of distances between the two points.

As described above, in the multifunction peripheral 100 according to the present embodiment, the user can specify a function to be used through the home screen 7 displayed on the display section 11. Accordingly, no hard keys for function selection, such as selection of the copying function, the scan/transmission function, etc. are provided in the operation panel 1 of the present embodiment. When the user desires to switch the screen to a setting screen for a different function (e.g., from the setting screen for the copying function to the setting screen for the scan/transmission function), for example, the user may carry out an operation to once return to the home screen 7.

Figure 11:
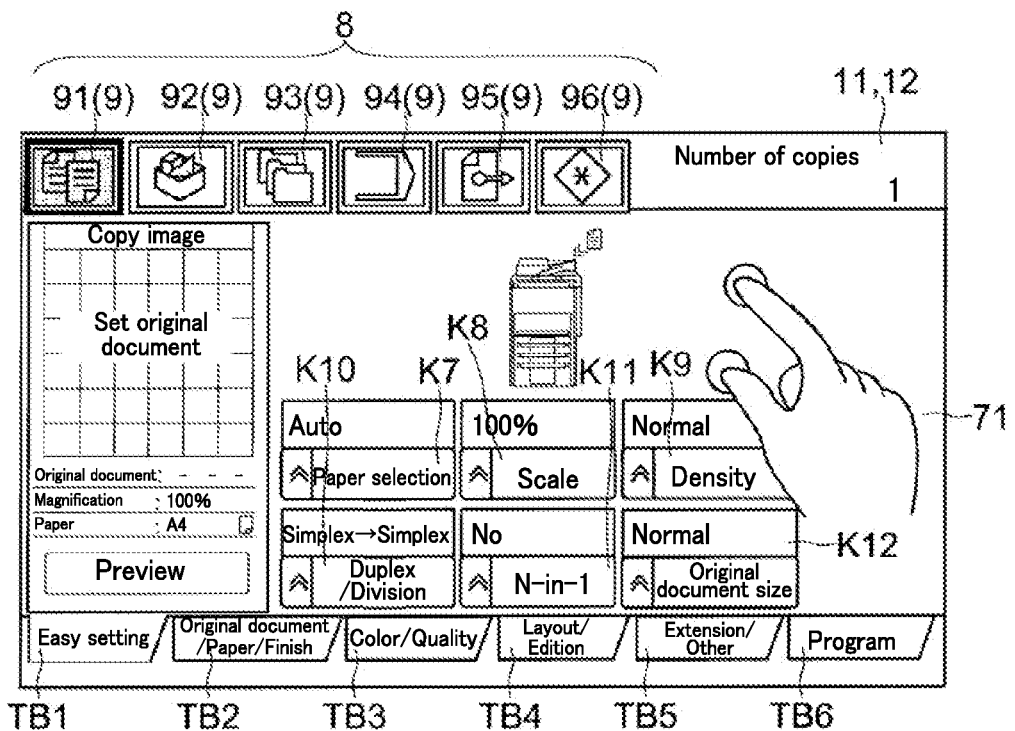
FIG. 11 is an explanatory drawing showing one example of a function selection menu displayed according to a vertical two-touch operation according to one embodiment of the present disclosure.
Figure 12:
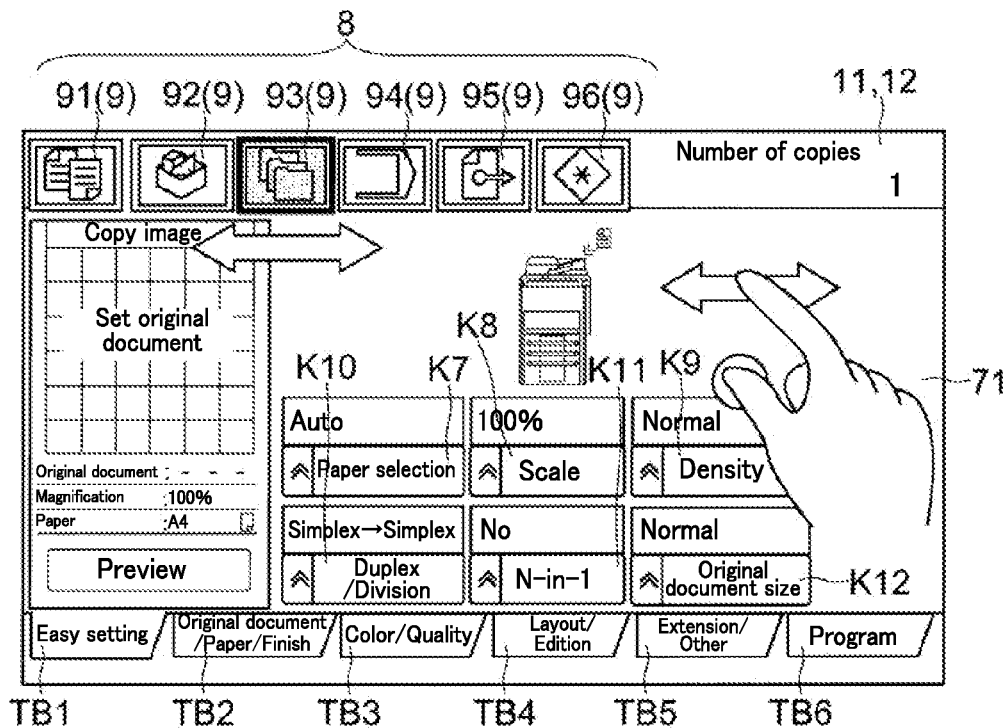
FIG. 12 is an explanatory drawing showing one example of an operation to change a function selected on the function selection menu according to one embodiment of the present disclosure.

In order to avoid such an operation, the operation panel 1 of the present embodiment displays a function selection menu 8 (see FIGS. 11 and 12). The function selection menu 8 allows for direct switch (jump) from a setting screen for a given function to a setting screen for another function. When the touch panel 12 receives simultaneous touch of two points, the panel controller 10 allows the display section 11 to display the function selection menu 8. In other words, two-point touch event can call up the function selection menu 8.

Although the details will be described later with reference to FIGS. 10-15, the panel controller 10 in the operation panel 1 of the present embodiment allows the display section 11 to display the function selection menu 8 so that the function selection menu 8 can be used easily by changing the display appearance, such as a display direction according to the positional relationship between the touched two points. The method for determining the positional relationship between the touched two points will be described first.

The panel controller 10 determines whether the positional relationship between the touched two points indicates either the vertical direction or the transverse direction. First, the panel controller 10 recognizes the positions (coordinates) of the simultaneously touched two points on the basis of the output from the touch panel 12.

Then, the panel controller 10 determines whether the positional relationship between touched the two points indicates either the vertical direction or the transverse direction on the basis of the angle defined by the two points. Specifically, as shown in FIG. 8, the panel controller 10 acknowledges one of the touched two points as a reference point P0. Acknowledgement as to which of the two points is the reference point P0 can be set arbitrarily. For example, the panel controller 10 always acknowledges a lower point in the vertical direction out of the two points as the reference point P0. Alternatively, the panel controller 10 may always acknowledge an upper point in the vertical direction out of the two points as the reference point P0, for example.

Subsequently, the panel controller 10 determines whether the positional relationship between the touched two points indicates either the vertical direction or the transverse direction on the basis of as to whether the other point of the touched two points is included in a predetermined angle range (a range from a first angle to a second angle) relative to the reference point P0. Referring to FIG. 8, the predetermined angle range includes a range between plus and minus 45 degrees (a hatched angle range $\theta1$) and a range between 135 degrees and 225 degrees (a hatched angle range $\theta2$) about the reference point P0 as a center. Here, the two angle ranges $\theta1$ and $\theta2$ are indicated. The angle range $\theta1$ of the predetermined angle range ranges from the first angle (minus 45 degrees) to the second angle (plus 45 degrees). The angle range $\theta2$ of the predetermined angle range ranges from the first angle (135 degrees) to the second angle (225 degrees). It is noted that the predetermined angle range shown in FIG. 8 is illustrated by way of example and not limitation, and the predetermined angle range can be set experimentally and/or existentially in an appropriate manner.

One example will be described with reference to FIG. 8. A point P1 in FIG. 8 is included (falls) in the predetermined angle range relative to the reference point P0.

In this case, the panel controller 10 determines that the positional relationship between the touched two points (the reference point P0 and the point P1) indicates the transverse direction. On the other hand, in the example shown in FIG. 8, a point P2 in FIG. 8 is not included (does not fall) in the predetermined angle range relative to the reference point P0. In this case, the panel controller 10 determines that the positional relationship between the touched two points (the reference point P0 and the point P2) indicates the vertical direction.

Alternatively, the panel controller 10 may determine whether the positional relationship between the touched two points indicates either the vertical direction or the transverse direction on the basis of a result of comparison between a distance between the two points in the vertical direction and a distance between the two points in the transverse direction. Specifically, as shown in FIG. 9, the panel controller 10 compares a distance in the transverse direction between the touched two points (a transverse distance X1) with a distance in the vertical direction between the touched two points (a vertical distance Y1). Then, the panel controller 10 determines that the positional relationship between the touched two points indicates the transverse direction when the transverse distance X1 is longer than the vertical distance Y1. On the other hand, the panel controller 10 determines that the positional relationship between touched the two points indicates the vertical direction when the vertical distance Y1 is longer than the transverse distance X1.

It is noted that the distance in vertical direction between the two points is a distance between the two points orthographically projected to the vertical axis in the vertical direction. The distance in transverse direction between the two points is a distance between the two points orthographically projected to the transverse axis in the transverse direction.

(Display of Function Selection Menu 8 when the Positional Relationship Between Touched Two Points Indicates Vertical Direction)

Figure 10:
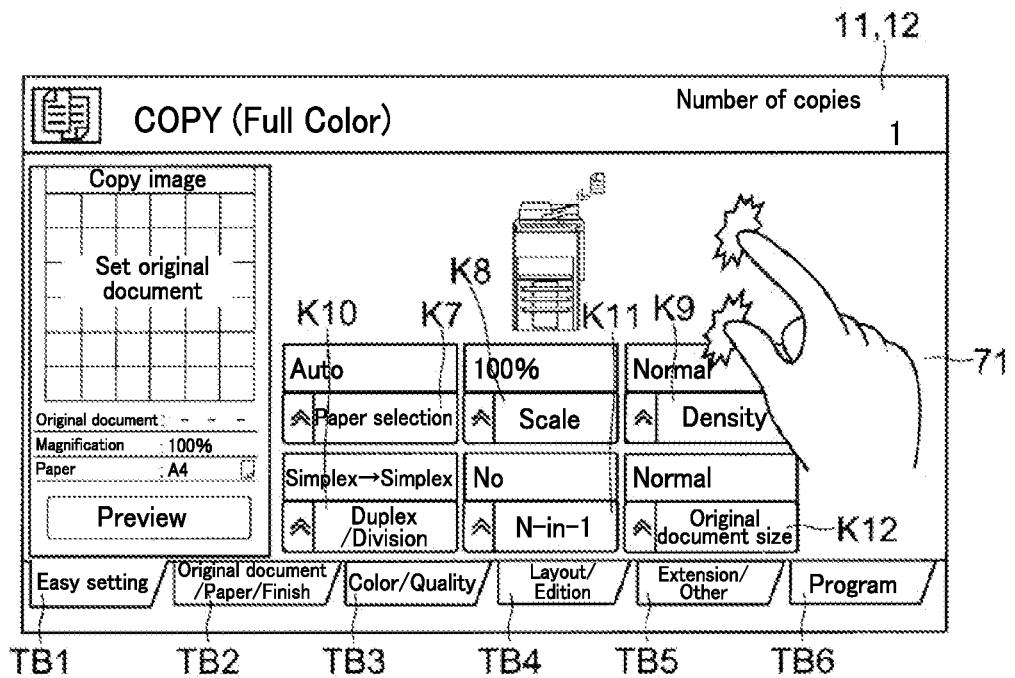
FIG. 10 is an explanatory drawing showing one example of two-point touch in the vertical direction according to one embodiment of the present disclosure.

One example will be described next with reference to FIGS. 10-12 about display of the function selection menu 8 when the positional relationship between touched the two points indicates the vertical direction. FIG. 10 is an explanatory drawing showing one example of two-point touch in the vertical direction. FIG. 11 is an explanatory drawing showing one example of the function selection menu 8 displayed according to the two-point touch in the vertical direction. FIG. 12 is an explanatory drawing showing one example of an operation to change the function that is selected on the function selection menu 8.

When the user desires to display a setting screen for a given function when the setting screen for another function is being displayed (FIGS. 10-12 shows the initial setting screen 71 for the copying function as one example), the user simultaneously touches two points on the touch panel 12. FIGS. 10-12 each show one example where the use's thumb and index finger touch the two points.

When the touch panel 12 receives the simultaneous two-point touch, data indicating the positions of the touched points is input to the panel controller 10. Subsequently, where the positional relationship between the touched two points indicates the vertical direction, as shown in FIG. 10, the panel controller 10 allows the display section 11 to display the function selection menu 8, as shown in FIG. 11. The function selection menu 8 is composed of a plurality of function key images 9 (each corresponding to an image that indicates a function) arranged in one line in the transverse direction. The function key images 9 are images that indicate functions different from each other.

FIG. 11 shows one example where the function selection menu 8 includes, as the function key images 9, a function key image 91 indicating the copying function, a function key image 92 indicating the application function, a function key image 93 indicating the box function, a function key image 94 indicating the program function, a function key image 95 indicating the scan/transmission function, and a function key image 96 indicating the status confirmation function. For example, the functions displayed as the function key images 9 on the function selection menu 8 are the same as the functions that are selectable through the home screen 7 (see FIG. 4).

Then, as shown in FIGS. 11 and 12, the panel controller 10 allows the display section 11 to display all the function key images 9 so that a function key image 9 in the selected state has an expression different from that of the function key images 9 not in the selected state thereon on the function selection menu 8. For example, as shown in FIGS. 11 and 12, the panel controller 10 allows the display section 11 to perform decoration display by which a function key image 9 in the selected state on the function selection menu 8 and the other function key images 9 not in the selected state thereon are displayed in different colors and decoration display by which the contour of the function key image 9 in the selected state is highlighted. Referring to another example, the panel controller 10 may perform only the former decoration display or only the latter decoration display. It is noted that the expression of the decoration display is not limited to the above examples, and any decoration display may be employable.

When the user desires to change the function key image 9 in the selected state, the user moves one of the two points, which are in touch with the touch panel 12, in the transverse direction (direction along the crosswise direction), while fixedly touching the other point. In other words, where the user desires to change the currently selected function key image 9, the user moves one of his/her fingers in touch in the transverse direction (direction along the crosswise direction) without moving the other finger in touch. FIG. 12 shows one example where the thumb is fixed, while the index finger is moved.

For example, when the moved one point is located on the right side of the fixed other point (i.e., when the index finger is on the right side of the thumb), the panel controller 10 changes the selected function key image 9 (i.e., changes the selected state of the function key image 9) sequentially from left to right. Alternatively, when the moved one point is located on the left side of the fixed other point (i.e., when the index finger is on the left side of the thumb), for example, the panel controller 10 changes the selected function key image 9 (i.e., changes the selected state of the function key image 9) sequentially from right to left. In other words, the panel controller 10 changes the selected state of the function key images 9 by changing the function key image 9, which is subjected to the decoration display, sequentially according to the moving direction (leftward or rightward) when the one point in touch with the touch panel 12 is moved in the transverse direction (the direction along the crosswise direction).

Next, in order to directly switch to a different function, the user removes his/her two fingers from the touch panel 12 in the state when the function key image 9 corresponding to the function to be called up (to which the user desires to switch) is selected. The touch panel 12 receives the event that the touched points are lost after detection of the two-point touch as input to instruct switch to a function corresponding to the function key image 9 in the selected state on the function selection menu 8. In other words, the panel controller 10 allows the display section 11 to display the initial setting screen for a function corresponding to the function key image 9 in the selected state when the touch panel 12 loses the touch. Thus, the user can switch to the screen for setting a desired function without returning to the home screen 7.

It is note that loss of the touched points is one example of a "predetermined input operation".

It is noted that the input to instruct switch to a function corresponding to the function key image 9 in the selected state on the function selection menu 8 is not limited to two-point removal from the touch panel 12, but may be another predetermined input operation. For example, the touch panel 12 may receive, as the input to instruct switch to a function corresponding to the function key image 9 in the selected state on the function selection menu 8, move of both the touched two points or repetition of the two-point touch within a short period of time at the same points or points extremely close thereto in a double click manner.

It is noted that "the predetermined input operation" corresponds to the input to instruct switch to a function corresponding to the function key image 9 in the selected state on the function selection menu 8 and is accordingly an operation to fix the selected state of the function key image 9. Further, "the predetermined input operation" is not limited to the above described examples.

(Display of Function Selection Menu 8 when the Positional Relationship Between Touched Two Points Indicates the Transverse Direction)

Figure 13:
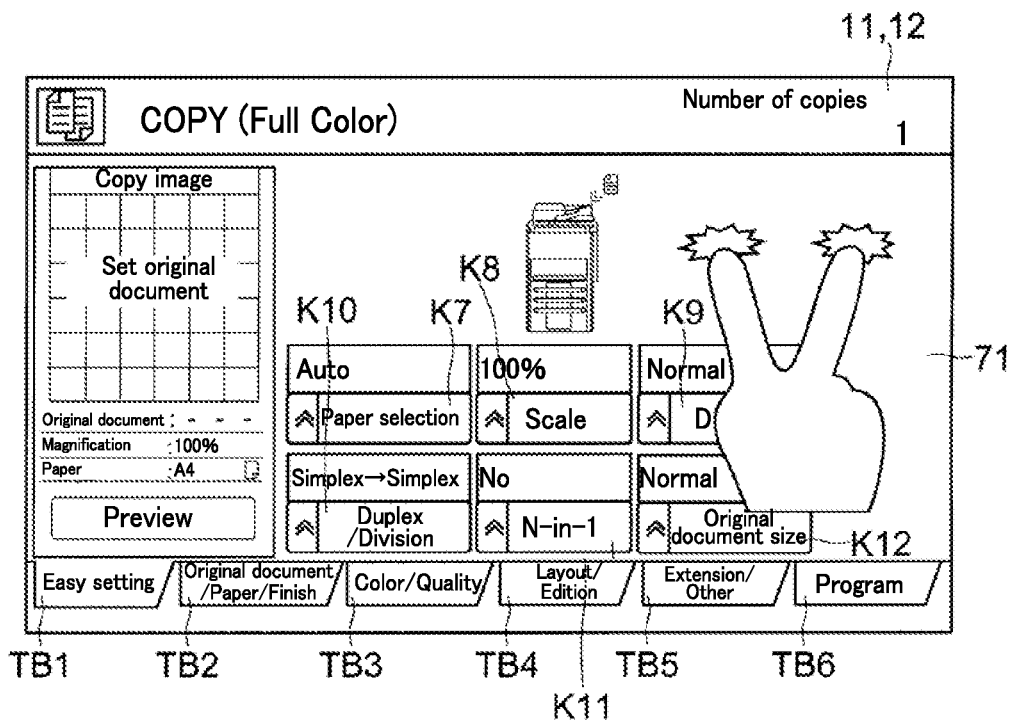
FIG. 13 an explanatory drawing showing one example of a transverse two-touch operation according to one embodiment of the present disclosure.
Figure 14:
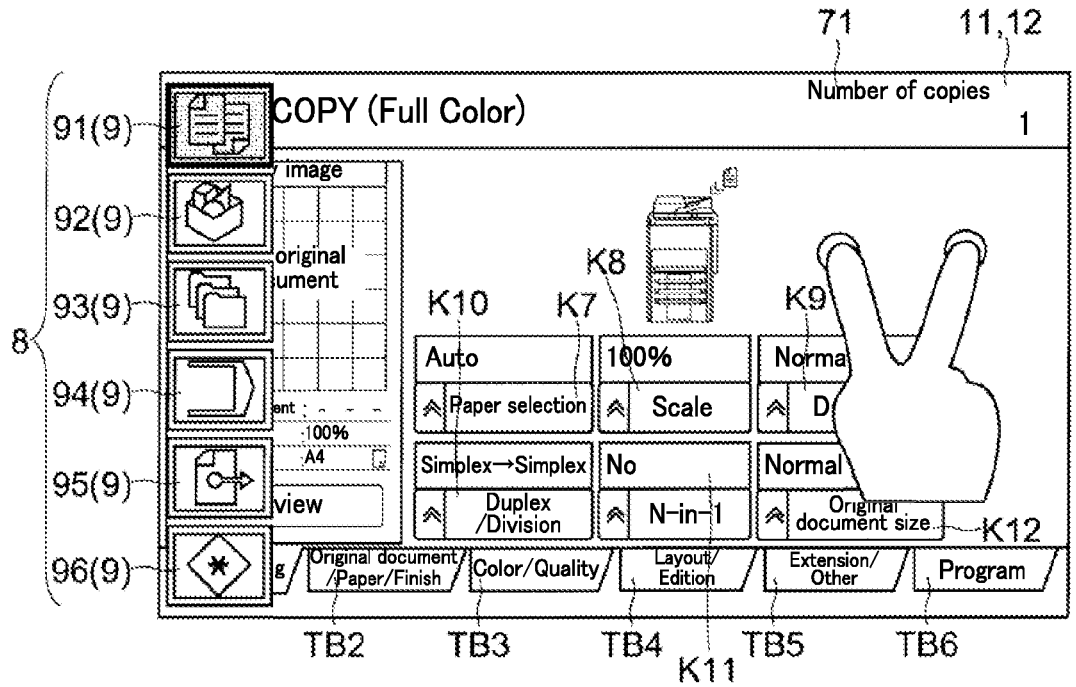
FIG. 14 is an explanatory drawing showing one example of a function selection menu displayed according to a transverse two-touch operation according to one embodiment of the present disclosure.
Figure 15:
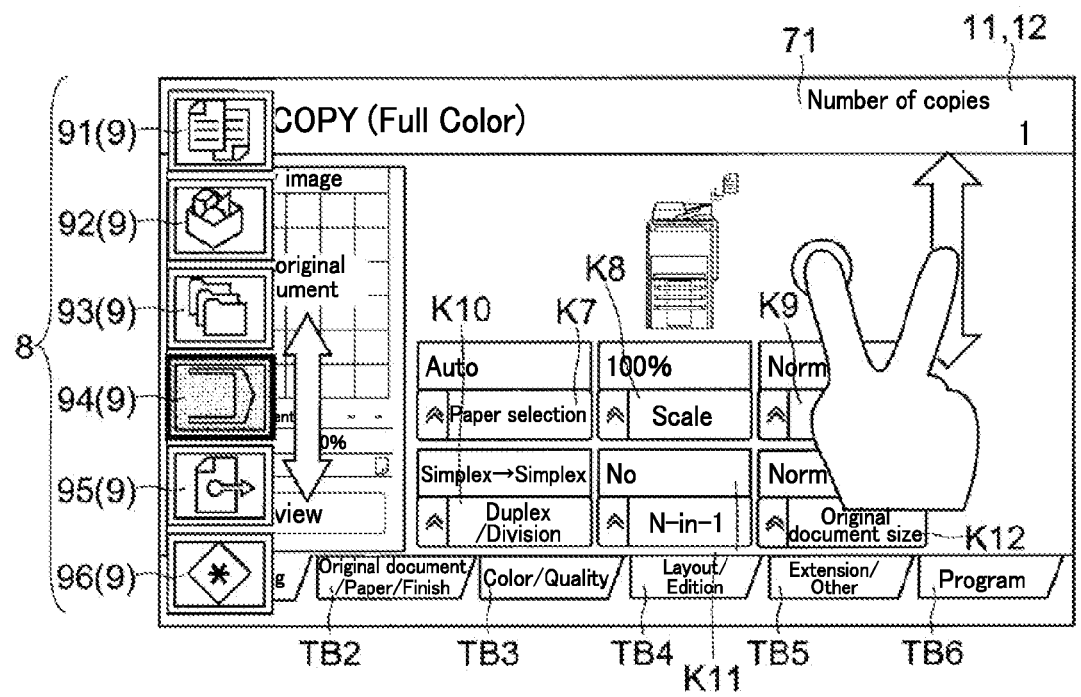
FIG. 15 is a an explanatory drawing showing one example of an operation to change a function selected on the function selection menu according to one embodiment of the present embodiment.

Description will be made next with reference to FIGS. 13-15 about one example of display on the function selection menu 8 when the positional relationship between touched two points indicates the transverse direction. FIG. 13 is an explanatory drawing showing one example of two-point touch in the transverse direction. FIG. 14 is an explanatory drawing showing one example of the function selection menu 8 displayed according to the two-point touch in the transverse direction. FIG. 15 is an explanatory drawing showing one example of an operation to change a function in the selected state on the function selection menu 8.

When the user desires to display a setting screen for a given function when the setting screen for another function is being displayed (the setting screen 71 for the copying function is displayed as one example in FIGS. 13-15), the user simultaneously touches two points on the touch panel 12. FIGS. 13-15 each show one example where the index finger and the middle finger touch the two points.

When the touch panel 12 receives the simultaneous two-point touch, data indicating the positions of the touched points is input to the panel controller 10. Subsequently, where the positional relationship between the touched two points indicates the transverse direction, as shown in FIG. 13, the panel controller 10 allows the display section 11 to display the function selection menu 8, as shown in FIG. 14. The function selection menu 8 is composed of the plurality of function key images 9 arranged in a line in the vertical direction.

FIG. 14 also shows one example where the function selection menu 8 includes the function key image 91 indicating the copying function, the function key image 92 indicating the application function, the function key image 93 indicating the box function, the function key image 94 indicating the program function, the function key image 95 indicating the scan/transmission function, and the function key image 96 indicating the status confirmation function.

Then, as shown in FIGS. 14 and 15, the panel controller 10 allows the display section 11 to display all the function key images 9 so that a function key image 9 in the selected state on the function selection menu 8 has an expression different from that of the function key images 9 not in the selected state thereon. For example, as shown in FIGS. 14 and 15, likewise the case where the function key images 9 are arranged in the transverse direction, the panel controller 10 allows the display section 11 to perform the decoration display on the function key image 9 in the selected state so as to be distinct from the function key images 9 not in the selected state.

Where the user desires to change the function key image 9 in the selected state, the user moves one of the two points, which are in touch with the touch panel 12, in the vertical direction (direction along the perpendicular direction), while fixedly touching the other point, as shown in FIG. 15. In other words, where the user desires to change the currently selected function key image 9, the user moves one of his/her fingers in touch in the vertical direction (direction along the perpendicular direction) without moving the other finger in touch. FIG. 15 shows one example where the index finger is fixed, while the middle finger moves, For example, when the moved one point is located upper than the fixed other point (i.e., when the index finger is located upper than the middle finger), the panel controller 10 changes the selected function key image 9 (i.e., changes the selected state of the function key image 9) sequentially from bottom up. Alternatively, when the moved one point is located lower than the fixed other point (i.e., when the index finger is located lower than the middle finger), for example, the panel controller 10 changes the selected function key image 9 (i.e., changes the selected state of the function key image 9) sequentially from top down. In other words, the panel controller 10 changes the function key image 9 in the selected state by changing the function key image 9, which is subjected to the decoration display, sequentially according to the moving direction (upward or downward) when the one point in touch with the touch panel 12 is moved in the vertical direction (along the perpendicular direction).

Next, even in the case where the positional relationship between the touched two points indicates the transverse direction, in order to directly switch to a setting screen for a different function, the user removes his/her two fingers from the touch panel 12 in the state where the function key image 9 corresponding to the function to be called up (to which the user desires to switch) is selected. The touch panel 12 receives the event that the touched points are lost after detection of the two-point touch as input to instruct switch to a function corresponding to the function key image 9 in the selected state on the function selection menu 8. In other words, the panel controller 10 allows the display section 11 to display the initial setting screen for a function corresponding to the function key image 9 in the selected state when the touch panel 12 loses the touch. Thus, the user can switch to the screen for setting a desired function without returning to the home screen 7.

It is should be noted that which fingers the user uses for his/hers simultaneous two-point touch with touch panel 12 differ individually. Some may use a combination of his/her thumb and index finger, while some may use a combination of his/her index and middle fingers. Or, some may use another combination of two fingers.

After the two-point touch, the user moves only one of the two fingers (moves the point where the one finger touches) while fixing the other finger (i.e., almost fixing the point where the other finger touches). In doing so, the direction where the user can easily move the one finger depends on the positional relationship of the fingers used for the two-point touch. In view of this, in the operation panel 1 of the present embodiment, the panel controller 10 determines whether the positional relationship between the simultaneously touched two points indicates either the vertical direction or the transverse direction. Then, the panel controller 10 allows the display section 11 to display the function selection menu 8 in which the plurality of function key images 9 are arranged in a direction where the user can easily move one of the fingers in accordance with the determination result. The direction where the user can easily move the one finger is a direction where one of the fingers used for two-point touch is easily moved (i.e., a direction where one of the touched points can be moved easily), while not moving the other finger (i.e., not moving the other touched point). Thus, the user can intuitively carry out an operation to select a function by displacing the touched point of the one finger (i.e., moving the one touched point). In this way, the user can easily select the function key image 9 corresponding to a function to which the user desires to switch (to use) by an intuitive operation.

(Process Flow of Function Selection in Two-Point Touch)

Figure 16:
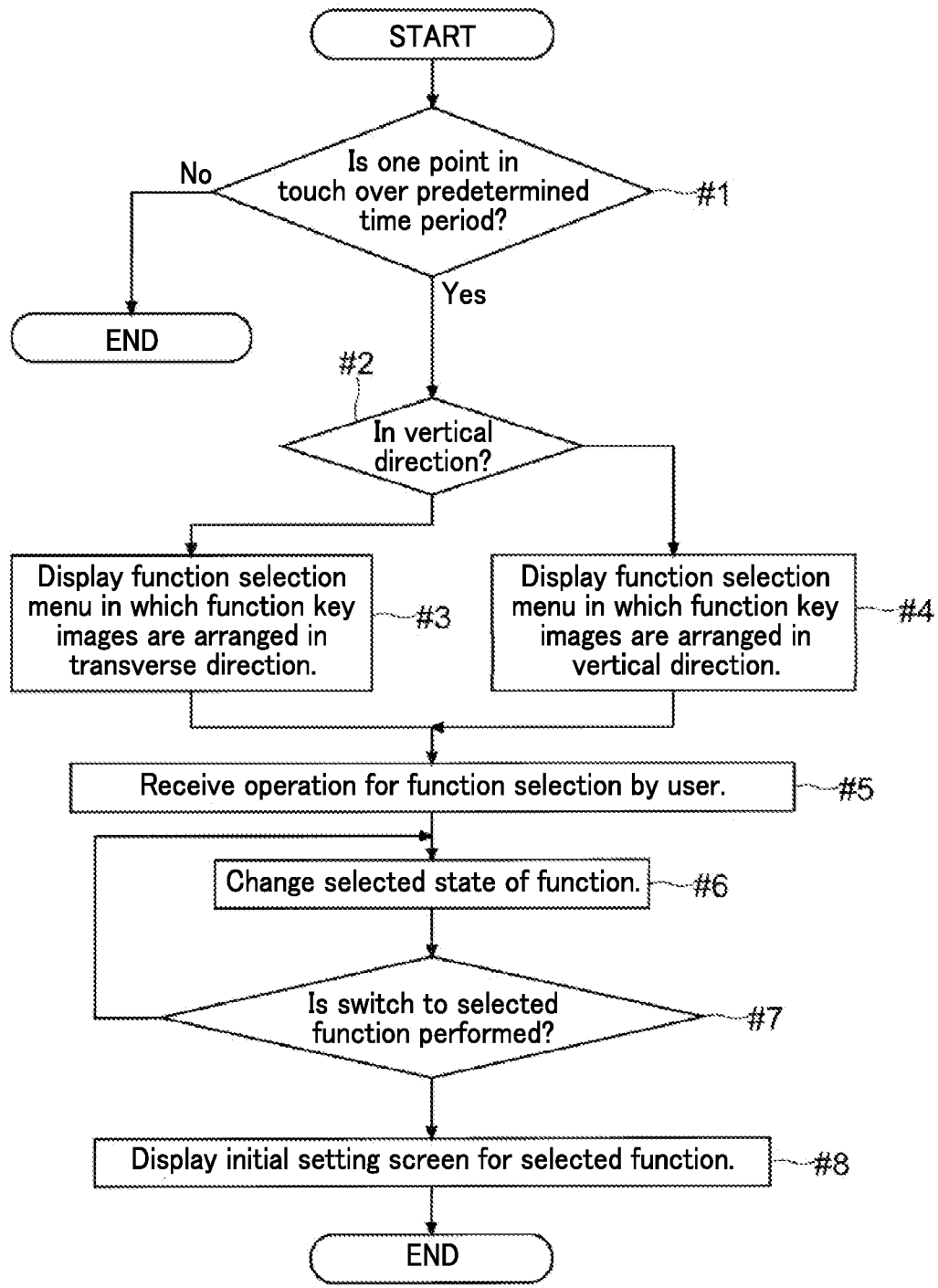
FIG. 16 is a flowchart depicting one example of a process flow for function selection upon receipt of two-point touch according to one embodiment of the present disclosure.

One example will be described next with reference to FIG. 16 about a process flow of function selection upon two-point touch. FIG. 16 is a flowchart showing one example of the process flow of function selection upon two-point touch.

The flowchart in FIG. 16 starts when the touch panel 12 receives (detects) simultaneous two-point touch in a setting screen for any one of the functions (the copying function, the box function, the scan/transmission function, etc.). In other words, the process flow in FIG. 16 starts when the touch panel 12 detects the simultaneous two-point touch, and the panel controller 10 recognizes, upon receipt of the detection result, the simultaneous two-point touch in the setting screen for the function.

First, the panel controller 10 determines, on the basis of the output from the touch panel 12, whether at least one of the two points is continuously in touch over a predetermined time period (preset period) (Step #1). The touch panel 12 periodically performs detection of the positions of the touched points. It is noted that the user recognizes (i.e., knows) that one of the two points should be continued to be in touch (i.e., one of the two points is almost fixed) in order to carry out jump to the setting screen for a desired function through the function selection menu 8. Accordingly, the panel controller 10 determines whether at least one of the two points is continued to be in touch over the predetermined time period to recognize that the user has an intention of jump to the setting screen through the function selection menu 8. The predetermined time period can be set to any period and may be in the range from 0.5 seconds to one second, for example. However, the time period is not limited thereto and can be set at arbitrary value experimentally and/or existentially, for example. It is noted that the predetermined time period may be set (stored) in a storage region (not shown) in the panel controller 10 or the memory 15, for example.

When the touch panel 12 loses the touched of both the two points in a short period of time (in the predetermined time period) (No in Step #1), it may means that the user erroneously touches the two points with no intention to use the function selection menu 8. In this case, the process terminates (END).

By contrast, when at least one of the two points is touched over the predetermined time period (Yes in Step #1), the panel controller 10 determines, on the basis of the output from the touch panel 12, whether the positional relationship between the touched two points indicates the vertical direction (Step #2).

When the positional relationship between the touched two points indicates the vertical direction (Yes in Step #2), the panel controller 10 allows the display section 11 to display the function selection menu 8 in which the plurality of function key images 9 are arranged in the transverse direction (Step #3). On the other hand, when the positional relationship between the touched two points indicates the transverse direction (No in Step #2), the panel controller 10 allows the display section 11 to display the function selection menu 8 in which the function key images 9 are arrange in the vertical direction (Step #4).

Then, the touch panel 12 receives an operation by which non-fixed one of the touched two points is moved (operation for function selection by the user) as input to change the selected function (input to change the selected state of the function) (Step #5). Subsequently, the panel controller 10 recognizes the moving direction where the non-fixed one point is moved on the basis of the output from the touch panel 12 and switches the function key image 9 to which the display to indicate that it is in the selected state on the function selection menu 8 (decoration display or ornament display) is applied, thereby changing the selected state of the function (Step #6).

Further, the panel controller 10 determines, on the basis of the output from the touch panel 12, whether the operation for switch to the function selected through the function selection menu 8 has been performed (Step #7). For example, the panel controller 10 determines whether the touch panel 12 detects the transition from a state where one- or two-point touch is detected to a state of no point touch (Step #7). When no operation for switch to the selected function is carried out (No in Step #7), the flow returns to Step #6.

On the other hand, when the operation for switch to the selected function is performed (Yes in Step #7), the panel controller 10 allows the display section 11 to display the initial setting screen for the function selected through the function selection menu 8 (Step #8). Then, the flow terminates (END).

Fingers for two-point touch may be positioned at various locations. In the case where the touched two points are aligned in the vertical direction, when the user makes the fingers in touch with the two points (e.g., the thumb and the index finger) to keep in touch with the touch panel 12 (the two points are continuously touched), the user can move one of the fingers in a sweeping manner with the other finger almost fixed. Accordingly, the user is apt to move the one finger in the transverse direction. Likewise, in the case where the touched two points are aligned in the transverse direction when the user makes the fingers in touch with the two points (e.g., the index and the middle finger) to keep in touch with the touch panel 12, the user is apt to move one of the fingers in the vertical direction with the other finger almost fixed.

In view of the above, the display/input device (the operation panel 1) of the present embodiment includes the display section 11 and the touch panel 12. The display section 11 displays an image. The touch panel 12 is provided in the display section 11 to receive user's input. In other words, the touch panel 12 detects touch with the display surface of the display section 11. In this case, the touch panel 12 can detect not only the position of one touch point but also the positions of a plurality of touch points. When the touch panel 12 detects simultaneous two-point touch, of which the positional relationship indicates the vertical direction, the display section 11 displays the function selection menu 8 in which the plurality of images (the function key images 9) each showing its corresponding function are arranged in the transverse direction. By contrast, when the touch panel 12 detects simultaneous two-point touch, of which the positional relationship indicates the transverse direction, the display section 11 displays the function selection menu 8 in which the plurality of images each showing its corresponding function are arranged in the vertical direction. Then, the touch panel 12 receives the operation by which one of the touched two points is moved as input to change the function selected through the function selection menu 8.

Accordingly, the user can call up the function selection menu 8 only by an easy operation, two-point touch. Further, the display section 11 can display the function selection menu 8 in a direction where a finger can be easily moved according to the positions of the fingers at two-point touch. In function selection through the function selection menu 8, the user can intuitively recognize that the direction where a finger is to be moved is the direction (longitudinal direction) where the function selection menu 8 is displayed. Then, when the user trails the touch panel 12 with one of the fingers in a direction where the finger can be easily moved, while almost fixing the other finger, the function in the selected state on the function selection menu 8 can be changed to a desired function.

Thus, the user can perform input for function selection seamlessly from the two-point touch. Further, no burden of the operation for function selection is imposed on the user. Furthermore, even when the positions of fingers used for two-point touch differs or the fingers are different, the display/input device (the operation panel 1) can flexibly cope with user' habit in two-point touch to display the function selection menu 8 in a manner that can allow the fingers to be easily moved. Still further, it is unnecessary to set a display direction of the function selection menu 8 for each user in order to easily use the function selection menu 8. Moreover, the user can select a desired function with ease without paying attention to the display direction of the function selection menu 8. In addition, since the user can select a desired function through the function selection menu 8, the display/input device (the operation panel 1) needs no hard key for the functions that are selectable through the function selection menu 8. Accordingly, the manufacturing cost and the size of the display/input device (the operation panel 1) can be reduced.

Furthermore, the touch panel 12 receives loss of point touch or any other predetermined input operation as input to instruct switch to the function in the selected state on the function selection menu 8. Thus, the display section 11 can display the setting screen for the function made to be in the selected state by moving one of the user's fingers with the other finger almost fixed.

Further, the display section 11 displays the home screen 7 as a screen located at the top of the hierarchy. The home screen 7 includes a plurality of keys, each of which is a key for selection of a function to be executed. When the touch panel 12 receives touch with a point where a key is displayed as specification of a function to be executed, the display section 11 displays the setting screen for the specified function. In the display/input device (the operation panel 1) according to the present embodiment, to which a function to be used can be input through the home screen 7 as described above, switch to the setting screen for the desired function can be achieved through the function selection menu 8 called up by two-point touch without returning to the home screen 7. For example, even though the home screen 7 is provided which can select a function to be used, such as the copying function, transmission function, etc., the use of the function selection menu 8 enables the user to directly switch to the setting screen for a function different in category.

Further, the display/input device (the operation panel 1) includes, as one example, a determination section (the panel controller 10) configured to recognize a positional relationship between touched two points. The determination section sets one of touched two points as a reference point P0. Then, the determination section determines whether the positional relationship between the touched two points indicates either the vertical direction or the transverse direction depending on whether the other point relative to the reference point P0 is included in the predetermined angel range (the first angle range θ1 or the second angle range θ2). The display section 11 displays the function selection menu 8 according to the determination result by the determination section. Accordingly, whether the positional relationship between the touched two points indicates either the vertical direction or the transverse direction can be determined appropriately.

Furthermore, the display/input device (the operation panel 1) includes, as another example, the determination section (the panel controller 10) configured to recognize a positional relationship between touched two points. The determination section compares the distance in the vertical direction (the vertical distance Y1) between the touched two points with the distance in the transverse direction (the transverse distance X1) between the touched two points. Then, according to the comparison result, the determination section determines that the positional relationship between the touched two points indicates the transverse direction when the distance in the transverse direction is longer than the distance in the vertical direction. On the other hand, when the comparison results in that the distance in the vertical direction is longer than the distance in the transverse direction, the determination section determines that the positional relationship between the touched two points indicates the vertical direction. The display section 11 then displays the function selection menu 8 according to the determination result by the determination section. Thus, whether the positional relationship between the touched two points indicates either the vertical direction or the transverse direction can be determined appropriately.

Still further, an image forming apparatus (e.g., the multi-function peripheral 100) includes the display/input device (the operation panel 1) according to the present embodiment. Accordingly, the image forming apparatus includes the display/input device (the operation panel 1) that is easily used. Thus, the image forming apparatus, which is easy for the user to use, can be provided.

Other embodiments will be described next. The above embodiments describe the examples in which the panel controller 10 recognizes that the positional relationship between touched the two points indicates the vertical direction or not, recognizes the positions of the touched points on the basis of the output from the touch panel 12, and controls display of the display section 11. However, the core controller 6 may perform the processing of the panel controller 10.

Embodiments of the present disclosure has been described, which does not limit the scope of the present disclosure, and various modifications are possible within the scope not deviated from the subject matter of the disclosure. For example, the following modifications are possible.

Figure 17:
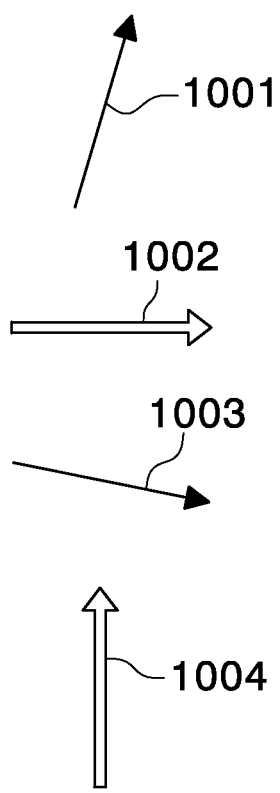
FIG. 17 is an explanatory drawing of a modified example of the embodiments of the present disclosure.

(1) In the above embodiments, when the positional relationship between the touched two points indicates the vertical direction, the plurality of function key images 9 are arranged in the transverse direction (see FIGS. 11 and 12). On the other hand, when the positional relationship between the touched two points indicates the transverse direction, the plurality of function key images 9 are arranged in the vertical direction (see FIGS. 14 and 15). Referring now to FIG. 17, the vertical direction for determination of the positional relationship between the two points is referred to as a first direction (arrow 1001), while the transverse direction in which the plurality of function key images 9 are arranged is referred to as a second direction (arrow 1002), for example. Still referring to FIG. 17, the transverse direction for determination of the positional relationship between the two points is referred to as a third direction (arrow 1003), while the vertical direction in which the plurality of function key images 9 are arranged is referred to as a fourth direction (arrow 1004), for example For example, according to detection by the touch panel 12 of touch with two points in a positional relationship indicating the first direction, the panel controller 10 allows the display section 11 to display the plurality of function key images 9 in the second direction different from the first direction. On the other hand, according to detection by the touch panel 12 of touch with two points in a positional relationship indicating the third direction, the panel controller 10 allows the display section 11 to display the plurality of function key images 9 in the fourth direction different from the second direction.

The first direction and the fourth direction are each set as the vertical direction, while the third direction and the second direction are each set as the transverse direction, in the embodiments described with reference to FIGS. 11, 12, 14, and 15. In other words, the first direction is the same as the fourth direction, while the third direction is the same as the second direction. However, it is possible that the first direction is different from the fourth direction, while the third direction is different from the second direction.

Further, for example, the angle difference between the first direction and the second direction is larger than the angle difference between the third direction and the second direction. The angle difference between the third direction and the fourth direction is larger than the angle difference between the first direction and the fourth direction.

(2) Referring to the embodiments described with reference to FIGS. 11, 12, 14, and 15 and the modified example described in (1), the plurality of function key images 9 displayed in the vertical direction are the same as those displayed in the transverse direction. In other words, the contents of the function selection menu 8 in the vertical direction and the contents of the function selection menu 8 in the transverse direction are the same. However, the contents of the function selection menu 8 in the vertical direction may be different from the contents of the function selection menu 8 in the transverse direction. For example, all of the function key images 9 displayed in the vertical direction may be the same as some of the plurality of function key images 9 displayed in the transverse direction. Alternatively, the plurality of function key images 9 displayed in the vertical direction may include some of the plurality of function key images 9 displayed in the transverse direction and a function key image different from the other function key images 9 displayed in the transverse direction, for example. Or, all of the function key images 9 displayed in the vertical direction may be a plurality of function key images different from the plurality of function key images 9 displayed in the transverse direction, for example.

In terms of the references described in (1), the contents of the function selection menu 8 displayed in the second direction may be different from the contents of the function selection menu 8 displayed in the fourth direction, for example. For example, all of the function key images 9 displayed in the second direction may be the same as some of the plurality of function key images 9 displayed in the fourth direction. For example, the plurality of function key images 9 displayed in the second direction may include some of the plurality of function key images 9 displayed in the fourth direction and a function key image different from the other function key images 9 displayed in the fourth direction. For example, all of the function key images 9 displayed in the second direction may be a plurality of function key images different from the plurality of function key images 9 displayed in the fourth direction.

(3) Referring to the embodiments described with reference to FIGS. 11, 12, 14, and 15 and the modified examples described in (1) and (2), the plurality of function key images 9 are displayed in either the transverse direction (the second direction) or the vertical direction (the fourth direction) according to the positional relationship between the touched two points. However, images to be displayed are not limited to only the function key images 9. For example, any images to be displayed can be set appropriately according to the specification and the like of the multifunction peripheral 100. Moreover, the plurality of function key images 9 may not be displayed as the function selection menu 8.

(4) Referring to the embodiments described with reference to FIGS. 11, 12, 14, and 15 and the modified examples described in (1)-(3), when the positional relationship between the touched two points indicates the vertical direction (the first direction), the operation panel 1 arranges the plurality of function key images 9 (a plurality of images) in the transverse direction (the second direction) (hereinafter referred to as "a first input mode"). On the other hand, when the positional relationship between the touched two points indicates the transverse direction (the third direction), the operation panel 1 arranges the plurality of function key images 9 (a plurality of images) in the vertical direction (the fourth direction) (hereinafter referred to as "a second input mode"). However, for example, the operation panel 1 can employ either the first input mode or the second input mode.

(5) Further, in the embodiments described with reference to Steps #5 and #6 in FIG. 16 and the modified examples described in (1)-(3), in the case where both the first input mode and the second input mode are employed, the user moves one of the touching fingers, while fixing the other touching finger to change the selected state of a function key image 9 (hereinafter referred to as "operation by contact"). However, the operation panel 1 may not change the selected state through the operation by contact. In this case, for example, detection by the operation panel 1 of touch with a displayed image may make the image to be in the selected state. For example, detection by the operation panel 1 of touch with a displayed image may make the image to be in the selected state and the selected state to be fixed.

(6) For example, even where only one of the first input mode and the second input mode is employed, the operation panel 1 may not change the selected state through the operation by contact. For example, the operation panel 1 may employ one of the first input mode and the second input mode, may not change the selected state through the operation by contact, and may not fix the selected state by "the predetermined input operation". For example, the operation panel 1 may employ both the first input mode and the second input mode, may not change the selected state through the operation by contact, and may not fix the selected state by "the predetermined input operation".

(7) In the embodiments described with reference to Steps #7 and #8 in FIG. 16 and the modified examples described in (1)-(6), when a state of a given function key image 9 is the selected state in the first input mode or the second input mode, the operation panel 1 detects "the predetermined input operation" and fixes the selected state, thereby allowing the setting screen for the function corresponding to the function key image 9 in the selected state to be displayed. However, for example, the operation panel 1 may employ the first input mode and the second input mode and may change the selected state through the operation by contact, but may not fix the selected state through "the predetermined input operation". In this case, for example, detection by the operation panel 1 of touch with a function key image 9 in the selected state displayed on the operation panel 1 in the first input mode and the second input mode can result in fixing of the selected state. Further, for example, pushing a hard key in the operation panel 1 in the first input mode and the second input mode may result in fixing of the selected state.

In addition, for example, the operation panel 1 may employ either the first input mode or the second input mode, may change the selected state through the operation by contact, but may not fix the selected state by "the predetermined input operation".

(8) The method for determining the positional relationship between the two points is not limited to those described with reference to FIGS. 8 and 9. For example, in Step #2 in FIG. 16, the panel controller 10 (the determination section) may determine whether the positional relationship between the touched two points indicates the vertical direction according to whether the direction indicated by the touched two points falls within a first range. In other words, the panel controller 10 (the determination section) determines that the positional relationship between the touched two points indicates the vertical direction when the direction indicated by the touched two points falls within the first range. On the other hand, when the direction indicated by the touched two points falls out of the first range, the panel controller 10 determines that the positional relationship between the touched two points indicates the transverse direction. It is noted that the first range ranges from a predetermined fifth direction to a predetermined sixth direction different from the fifth direction. The first range can be set to any range experimentally and/or existentially.

(9) In the embodiments described with reference to FIGS. 8 and 9 and the modified examples described in (1), (2), (3), (5), and (7), the direction indicated by the positional relationship between the two points is necessarily determined as the vertical direction (the first direction) or the transverse direction (the third direction). However, a range or a condition may be provided in which the direction indicated by the positional relationship between the two points is determined neither as the vertical direction (the first direction) nor the transverse direction (the third direction). For example, a second range and a third range may be set for the vertical direction and the transverse direction, respectively. A range that is neither for the vertical direction nor the transverse direction is provided between the second range and the third range. It is noted that the second range ranges from a predetermined seventh direction to a predetermined eighth direction different from the predetermined seventh direction. The third range ranges from a predetermined ninth direction to a predetermined tenth direction different from the predetermined ninth direction.

At Step #2 in FIG. 16, when the direction indicated by the touched two points falls in the second range, the panel controller 10 (the determination section) determines that the positional relationship between the touched two points indicates the vertical direction. Then, the routine proceeds to Step #3. On the other hand, when the direction indicated by the touched two points falls in the third range at Step #2 in FIG. 16, the panel controller 10 (the determination section) determines that the positional relationship between the touched two points indicates the transverse direction. Then, the routine proceeds to Step #4. It is noted that the second range and the third range can be set to any ranges experimentally and/or existentially.

What is claimed is:

1. A display/input device, comprising:
a display section;
a touch panel configured to detect touch with a display surface of the display section; and
a control section configured to allow the display section to display a home screen locate at a top of hierarchy, wherein
the home screen includes a plurality of keys each for selecting a function,
the control section
when the touch panel detects that a point where one of the keys is displayed is touched, allows the display section to display a setting screen for setting the function corresponding to the touched key in place of the home screen, and
when the touch panel detects touch of two points on the setting screen of which a positional relationship indicates a first direction, allows the display section to display a first function selection menu separately from the two points on the setting screen, said first direction being either a horizontal direction or a vertical direction,
the first function selection menu includes a plurality of images corresponding to the keys and arranged in a second direction perpendicular to the first direction,
the images indicate the functions corresponding to the keys,
the control section changes a selected state of an image of the plurality of images according to move of one point of the two points separated from the first function menu,
when the touch panel detects touch of two points on the setting screen of which a positional relationship indicates the second direction, the control section allows the display section to display a second function selection menu separately from the two points on the setting screen,
the second function selection menu includes a plurality of images arranged in the first direction,
the plurality of images of the second function selection menu include all or some of the plurality of images of the first function selection menu or are different from the plurality of images of the first function selection menu,
the display input/output device further comprises a determination section configured to determine a positional relationship between the two points,
the determination section determines that the positional relationship between the two points indicates the first direction when a direction indicates by the two points falls in a second range and determines that the positional relationship between the two points indicates the second direction when the direction indicates by the two points falls in a third range, and
the control section allows the display section to display either of the first function selection menu and the second function selection menu according to a determination results by the determination section.

2. The device of claim 1, wherein
when the touch of the two points is lost after detection of the touch of the two points or when the touch panel detects an input operation to fix the selected state after detection of the touch of the two points, the control section allows the display section to display a screen for setting the function that the image in the selected state indicates.

3. The device of claim 1, wherein
when an input operation to fix the selected state is performed on the touch panel, the control section allows the display section to display a screen for setting the function that the image in the selected state indicates.

4. An image forming apparatus, comprising:
the display/input device of claim 1; and
an image forming section configured to form an image on a recording medium according to a set content input through the display/input device.

5. The display/input device according to claim 1, wherein
the control section changes the selected state of the image sequentially from left to right when the one point is moved to a right side of a fixed point of the two points, and changes the selected state of the image sequentially from right to left when the one point is moved to a left side of a fixed point of the two points.

6. The display/input device according to claim 1, wherein
the control section changes the selected state of the image sequentially from bottom up when the one point is moved to a location upper than a fixed point of the two points, and changes the selected state of the image sequentially from top down when the one point is moved to a location lower than a fixed point of the two points.

7. The display/input device according to claim 1, wherein the plurality of images of the first function selection menu include an image indicating the function to be set on the setting screen.

8. The display/input device according to claim 7, wherein upon the first function selection menu being displayed on the display, the image indicating the function to be set on the setting screen is in an initially selected state.

9. The display/input device according to claim 1, wherein the setting screen has a rectangular shape including a pair of first sides opposite to each other and a pair of second sides opposite to each other, and
the first function selection menu is displayed along one of the first sides in contact with the one of the first sides.

10. The display/input device according to claim 1, wherein the functions include all or some of a copy function, an application function, a box function, a program function, a scan/transmission function, and a status confirmation function,
the application function is a function for invoking an installed application,
the box function is a function of causing a storage device to store image data,
the program function is a function of invoking a predetermined program,
the scan/transmission function is a function of reading an original document and transmitting image data of the read original document, and
the status confirmation function is a function of causing the display section to display a status indication screen for displaying a status of an image forming apparatus.

11. The display/input device according to claim 1, which is set in an image forming apparatus and includes no hard key for selecting any of the functions.

12. The display/input device according to claim 1, wherein the control section does not cause the display section to simultaneously display the first function selection screen and the second function selection screen.

13. A display/input device comprising:
a display section;
a touch panel configured to detect touch with a display surface of the display section; and
a control section configured to allow the display section to display a home screen locate at a top of a hierarchy, wherein
the home screen includes a plurality of keys each for selecting a function,
the control section
when the touch panel detects that a point where one of the keys is displayed is touched, allows the display section to display a setting screen for setting the function corresponding to the touched key in place of the home screen, and
when the touch panel detects touch of two points on the setting screen of which a positional relationship indicates a first direction, allows the display section to display a first function selection menu separately from the two points on the setting screen, said first direction being either a horizontal direction or a vertical direction,
the first function selection menu includes a plurality of images corresponding to the keys and arranged in a second direction perpendicular to the first direction,
the images indicate the functions corresponding to the keys,
the control section changes a selected state of an image of the plurality of images according to move of one point of the two points separated from the first function menu,
when the touch panel detects touch of two points on the setting screen of which a positional relationship indicates the second direction, the control section allows the display section to display a second function selection menu separately from the two points on the setting screen,
the second function selection menu includes a plurality of images arranged in the first direction, and
the plurality of images of the second function selection menu includes all or some of the plurality of images of the first function selection menu or are different from the plurality of images of the first function selection menu,
the display input/output device further comprises a determination section configured to determine a positional relationship between the two points,
the determination section determines whether the positional relationship between the two points indicates wither the first direction or the second direction according to whether one of the two points relative to a reference points falls in an angle range from a first angel to a second angle, the reference point being the other point, and
the control section allows the display section to display either of the first function selection menu and the second function selection menu according to a determination result by the determination section.

14. The display/input device according to claim 13, wherein
when the touch of the two points is lost after detection of the touch of the two points or when the touch panel detects an input operation to fix the selected state after detection of the touch of the two points, the control section allows the display section to display a screen for setting the function that the image in the selected state indicates.

15. The display/input device according to claim 13, wherein
when an input operation to fix the selected state is performed on the touch panel, the control section allows the display section to display a screen for setting the function that the image in the selected state indicates.

16. An image forming apparatus, comprising:
the display/input device of claim 13; and
an image forming section configured to form an image on a recording medium according to a set content input through the display/input device.

17. A display input/output device comprising:
a display section;
a touch panel configured to detect touch with a display surface of the display section; and
a control section configured to allow the display section to display a home screen locate at a top of a hierarchy, wherein
the home screen includes a plurality of keys each for selecting a function,
the control section
when the touch panel detects that a point where one of the keys is displayed is touched, allows the display section to display a setting screen for setting the function corresponding to the touch key in place of the home screen, and
when the touch panel detects touch of two points on the setting screen of which a positional relationship indicates a first direction, allows the display section to display a first function selection menu separately from the two points on the setting screen, said first direction being either a horizontal direction or a vertical direction, the first function selection menu includes a plurality of images corresponding to the keys and arranged in a second direction perpendicular to the first direction, the images indicate the functions corresponding to the keys, the control section changes a selected state of an image of the plurality of images according to move of one point of the two points separated from the first function menu, when the touch panel detects touch of two points on the setting screen of which a positional relationship indicates the second direction, the control section allows the display section to display a second function selection menu separately from the two points on the setting screen, the second function selection menu includes a plurality of images arranged in the first direction, and the plurality of images of the second function selection menu includes all or some of the plurality of images of the first function selection menu or are different from the plurality of images of the first function selection menu, the display input/output device further comprises a determination section configured to determine the positional relationship between the two points, the determination section compares a distance in the first direction between the two points with a distance in the second direction between the two points, determines that the positional relationship between the two points indicates the first direction when the distance in the first direction is longer than the distance in the second direction, and determines that the positional relationship between the two points indicates the second direction when the distance in the second direction is longer than the distance in the first direction, and the control section allows the display section to display either of the first function selection menu and the second function selection menu according to a determination result by the determination section.

18. The display/input device according to claim 17, wherein when the touch of the two points is lost after detection of the touch of the two points or when the touch panel detects an input operation to fix the selected state after detection of the touch of the two points, the control section allows the display section to display a screen for setting the function that the image in the selected state indicates.

19. The display/input device according to claim 17, wherein when an input operation to fix the selected state is performed on the touch panel, the control section allows the display section to display a screen for setting the function that the image in the selected state indicates.

20. An image forming apparatus, comprising:

the display/input device of claim 17; and an image forming section configured to form an image on a recording medium according to a set content input through the display/input device.

* * * * *